US009084261B2

(12) United States Patent
Gholmieh et al.

(10) Patent No.: US 9,084,261 B2
(45) Date of Patent: Jul. 14, 2015

(54) DISCONTINUOUS UPLINK TRANSMISSION OPERATION AND INTERFERENCE AVOIDANCE FOR A MULTI-CARRIER SYSTEM

(75) Inventors: Aziz Gholmieh, San Diego, CA (US); Danlu Zhang, San Diego, CA (US); Bibhu P. Mohanty, San Diego, CA (US); Arjun Bharadwaj, San Diego, CA (US); Sharad D. Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 347 days.

(21) Appl. No.: 12/720,911

(22) Filed: Mar. 10, 2010

(65) Prior Publication Data

US 2010/0260121 A1 Oct. 14, 2010

Related U.S. Application Data

(60) Provisional application No. 61/160,645, filed on Mar. 16, 2009.

(51) Int. Cl.
*H04W 4/00* (2009.01)
*H04W 76/04* (2009.01)
(Continued)

(52) U.S. Cl.
CPC ......... *H04W 76/048* (2013.01); *H04L 27/0006* (2013.01); *H04L 27/2601* (2013.01); *H04W 76/025* (2013.01)

(58) Field of Classification Search
CPC .......... H04L 27/2601; H04L 27/0006; H04W 76/048; H04W 76/025
USPC .......................................... 370/329
See application file for complete search history.

(56) References Cited

U.S. PATENT DOCUMENTS

| 8,094,595 B2 | 1/2012 | Montojo et al. |
| 2004/0071226 A1* | 4/2004 | Shu et al. ...................... 375/299 |

(Continued)

FOREIGN PATENT DOCUMENTS

| JP | 2011519539 A | 7/2011 |
| JP | 2012510207 A | 4/2012 |

(Continued)

OTHER PUBLICATIONS

"White Paper—Dual Cell HSDPA and its Future Evolution" by Eiko Seidel et al. on Jan. 2009.*

(Continued)

*Primary Examiner* — Ayaz Sheikh
*Assistant Examiner* — Hai-Chang Hsiung
(74) *Attorney, Agent, or Firm* — Darren M. Simon

(57) ABSTRACT

Systems, methods, devices, and computer program products are described for discontinuous multi-carrier uplink management in a wireless communication system. Common timing parameters may be identified for use in relation to discontinuous uplink transmissions on each of a two or more wireless carriers concurrently transmitting from an access terminal. A first operational state is associated with a first wireless carrier, while a second, different state is associated with a second wireless carrier. The first carrier may be operated in the first operational state concurrently with the second carrier being operated in the second operational state, with each carrier operated in accordance with the common timing parameters.

29 Claims, 14 Drawing Sheets

(51) Int. Cl.
*H04L 27/00* (2006.01)
*H04L 27/26* (2006.01)
*H04W 76/02* (2009.01)

(56) References Cited

U.S. PATENT DOCUMENTS

| | | | |
|---|---|---|---|
| 2007/0070908 A1* | 3/2007 | Ghosh et al. | 370/236 |
| 2007/0091817 A1* | 4/2007 | Yoon et al. | 370/252 |
| 2007/0133479 A1* | 6/2007 | Montojo et al. | 370/335 |
| 2007/0242786 A1* | 10/2007 | Kim et al. | 375/354 |
| 2008/0268863 A1 | 10/2008 | Pedersen et al. | |
| 2008/0293426 A1* | 11/2008 | Kim et al. | 455/450 |
| 2009/0168770 A1* | 7/2009 | Mohanty | 370/389 |

FOREIGN PATENT DOCUMENTS

| | | |
|---|---|---|
| TW | 2009908768 A | 2/2009 |
| WO | WO-2009132290 A2 | 10/2009 |
| WO | WO-2010059926 A1 | 5/2010 |

OTHER PUBLICATIONS

3GPP TR25.903 V8.0.0 on Dec. 2008.*
Ericsson: "Considerations on Dual-Cell HSDPA Operation" 3GPP Draft; R1-081545, 3rd Generation Partnership Project (3GPP), Mobile Competence Centre ; 650, Route Des Lucioles ; F-06921 Sophia-Antipolis Cedex ; France, vol. RAN WG1, no. Shenzhen, China; 20080327, Mar. 27, 2008, XP050109958 [ retrieved on Mar. 27, 2008] the whole document.
International Search Report and Written Opinion—PCT/US2010/027324, International Search Authority—European Patent Office—Sep. 24, 2010.
NTT DoCoMo: "Views on DRX/DTX control in LTE" 3GPP TSG RAN WG2 56BIS R2-070279, Jan. 19, 2007, XP008110222 Sorrento, Italy the whole document.
3GPP, "3rd Generation Partnership Project: Technical Specification Group Radio Access Network, Continuous connectivity for packet data users (Release 8)", 3GPP TR 25.903 V8.0.0, (Dec. 2008), pp. 130-133.
Qualcomm Europe: "DC-HSDPA and CPC", 3GPP TSG-RAN WG1#53 bis R1-082294, Jun. 30, 2008.
Qualcomm Europe: "DC-HSUPA and CPC", 3GPP TSG-RAN WG1#56 bis R1-091157, Mar. 17, 2009.
Qualcomm Europe: "System Simulation Results for Dual Carrier HSUPA Operation". 3GPP TSG-RAN WG1#56, R1-090573, Feb. 10, 2009, Feb. 14, 2009, pp. 1-11, XP002589068 Athes Gr Retrieved from the Internet: URL: http://ftp.3gpp.org/specs/html-1nfo/TDocExMtgá∈"RI-56á∈"27291. htm [retrieved on Jun. 24, 2010].
Taiwan Search Report—TW099107643—TIPO—Mar. 21, 2013.

* cited by examiner

DISCONTINUOUS UPLINK TRANSMISSION OPERATION AND INTERFERENCE AVOIDANCE FOR A MULTI-CARRIER SYSTEM

CROSS-REFERENCES TO RELATED APPLICATIONS

This application claims the benefit of U.S. Provisional Application No. 61/160,645 entitled "DISCONTINUOUS UPLINK TRANSMISSION OPERATION AND INTERFERENCE AVOIDANCE FOR A MULTI-CARRIER SYSTEM" filed Mar. 16, 2009, which is incorporated herein by reference for all purposes.

BACKGROUND

The following relates generally to wireless communication, and more specifically to control of multi-carrier uplink behavior for multi-carrier wireless communication systems. Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system may include a number of base stations to simultaneously support communication for multiple mobile terminals. Each mobile terminal communicates with one or more base stations via transmissions on the forward and reverse links. A reference to a "downlink" refers to the communication link from the base stations to the terminals, and a reference to an "uplink" refers to the communication link from the terminals to the base stations. The system may support operation on multiple carriers. Each carrier may be associated with a particular center frequency and a particular bandwidth. Each carrier may carry pilot and overhead information to support operation on the carrier, and carry data for terminals operating on the carrier.

Typically, in two-way conversations, each party speaks for sometime during which a communication system transmits the party's speech (e.g., less than half of the time) and pauses for other times during which the communication system transmits silence or background noise. Discontinuous transmission (DTX) during the silence (or background noise) period may have little impact on the perceptual quality of the conversation but may reduce inter-/intra-cell interference (therefore potentially increasing the system capacity) and conserving the battery power of a mobile terminal used for the conversation. When multiple carriers may be used on the uplink from a mobile terminal, the configuration of DTX can present challenges.

SUMMARY

The described features generally relate to one or more improved systems, methods and/or apparatuses for discontinuous uplink transmissions. Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

Systems, methods, devices, and computer program products are described for discontinuous multi-carrier uplink management in a wireless communication system. In one example, common timing parameters are identified for use in relation to discontinuous uplink transmissions on each of two or more wireless carriers concurrently transmitting from an access terminal. A first operational state (e.g., a data transmitting state) is associated with a first wireless carrier. A second, different state (e.g., a periodic burst state during an inactive data transmission period) is associated with a second wireless carrier. The second carrier is operated in the second operational state concurrently with the first carrier being operated in the first operational state, and each carrier is operated in accordance with the common timing parameters.

An exemplary access terminal for discontinuous multi-carrier uplink communication includes: one or more antennas configured to transmit and receive wireless communications; a transceiver coupled with the antenna; and a memory configured to store data identifying common timing parameters to be used in relation to discontinuous uplink transmissions on each of a plurality of wireless carriers usable for concurrent transmissions from the access terminal. The exemplary access terminal also includes a processor coupled with the transceiver and the memory, and configured to: identify a first operational state to be associated with a first carrier of the plurality of wireless carriers; identify a second operational state, different from the first operational state, to be associated with a second carrier of the plurality of wireless carriers; and cause the transceiver to operate on the first carrier in the first operational state concurrently with operating on the second carrier in the second operational state and in accordance with the common timing parameters.

Examples of such an access terminal may include one or more of the following features: the first operational state comprises a data transmitting state and the second operational state comprises a periodic burst state during an inactive data transmission period; or, the first operational state comprises a first periodic burst state during an inactive data transmission period, and the second operational state comprises a second periodic burst state during an inactive data transmission period, wherein there is a longer duration between bursts in the second periodic burst state than the first periodic burst state. The first operational state and the second operational state may have a common and synchronized transmit timing interval.

Also or alternatively, such an access terminal may include examples wherein the common timing parameters include: a same burst length for burst transmission during an inactive data transmission period; a same time between bursts during an inactive data transmission period; and a same first time between bursts during a first inactive data transmission period and a same second time, longer than the first time, between bursts during a second inactive data transmission period, the second inactive period occurring for a respective carrier when an inactivity timer exceeds a threshold. The threshold may be a common inactivity threshold.

Also or alternatively, the first carrier and second carrier may be adjacent carriers, and there may be one or more additional carriers. In some examples, there may be additional unused carriers between the first and second carriers. Such an access terminal may include examples wherein the processor is further configured to: identify the second operational state to be associated with a third carrier of the plurality of wireless carriers and cause the transceiver to operate on the third carrier in the second operational state in accordance with the common timing parameters. The processor may further be configured to cause the transceiver to operate concurrently on the second carrier in the second operational state and the third carrier in the second operational state, wherein the second carrier and the third carrier have a common and synchronized transmit timing interval. The processor may further be configured to receive schedule information for the first operational state on the first carrier at the access terminal and to receive schedule information for the second operational state on the second carrier at the access terminal.

An exemplary device for discontinuous uplink transmissions on a plurality of wireless carriers includes: means for identifying common timing parameters to be used for discontinuous uplink transmissions on each of a plurality of wireless carriers usable for concurrent transmissions from an access terminal; means for identifying a first operational state to be associated with a first carrier of the plurality of wireless carriers; means for identifying a second operational state, different from the first operational state, to be associated with a second carrier of the plurality of wireless carriers; means for causing the first carrier to be operated in the first operational state in accordance with the common timing parameters; and means for causing the second carrier to be operated in the second operational state in accordance with the common timing parameters, wherein the second carrier is operated in the second operational state concurrently with the first carrier being operated in the first operational state.

Examples of such a device may include one or more of the following features: the first operational state comprises a data transmitting state and the second operational state comprises a periodic burst state during an inactive data transmission period on the second carrier; and, the first operational state and the second operational state have a common transmit timing interval.

An exemplary computer program product for discontinuous uplink transmissions on a plurality of wireless carriers includes processor-readable instructions configured to cause a processor to: identify common timing parameters to be used in relation to discontinuous uplink transmissions on each of a plurality of wireless carriers usable for concurrent transmissions from an access terminal; identify a first operational state to be associated with a first carrier of the plurality of wireless carriers; identify a second operational state, different from the first operational state, to be associated with a second carrier of the plurality of wireless carriers; cause the first carrier to be operated in the first operational state in accordance with the common timing parameters; and cause the second carrier to be operated in the second operational state in accordance with the common timing parameters.

Examples of such a device may include one or more of the following features: instructions to transmit the first operational state schedule information to the access terminal and instructions to transmit the second operational state schedule information to the access terminal; or, instructions to receive schedule information for the first operational state on the first carrier at the access terminal and receive schedule information for the second operational state on the second carrier at the access terminal. The computer program product may be integrated into an access terminal.

An exemplary processor for discontinuous uplink transmissions on a plurality of wireless carriers includes: a parameter controller configured to identify common timing parameters to be used in relation to discontinuous uplink transmissions on each of a plurality of wireless carriers usable for concurrent transmissions from an access terminal; a first carrier state controller configured to identify a first operational state to be associated with a first carrier of the plurality of wireless carriers and cause the first carrier to be operated in the first operational state in accordance with the common timing parameters; and a second carrier state controller configured to identify a second operational state, different from the first operational state, to be associated with a second carrier of the plurality of wireless carriers and cause the second carrier to be operated in the second operational state in accordance with the common timing parameters.

Examples of such a processor may include one or more of the following features: memory configured to store common timing parameters to be used for discontinuous uplink transmissions on each of a plurality of wireless carriers usable for concurrent transmissions from an access terminal, and store schedule information for the first operational state on the first carrier at the access terminal and store schedule information for the second operational state on the second carrier at the access terminal. The processor may be integrated into an access terminal or base station controller.

An exemplary method for discontinuous uplink transmissions on a plurality of wireless carriers includes: establishing common timing parameters to be used in relation to discontinuous uplink transmissions on each of a plurality of wireless carriers usable for concurrent transmissions from an access terminal; identifying a first operational state for the access terminal on a first carrier of the plurality of wireless carriers; and identifying a second operational state, different from the first operational state, for the access terminal on a second carrier of the plurality of wireless carriers, wherein the first operational state and the second operational state operate concurrently. By way of example, the first operational state may be a data transmitting state and the second operational state may be a periodic burst state during an inactive data transmission period; or, the first operational state comprises a first periodic burst state during an inactive data transmission period, and the second operational state comprises a second periodic burst state during an inactive data transmission period, wherein there is a longer duration between bursts in the second periodic burst state than the first periodic burst state. The first operational state and the second operational state may have a synchronized transmit timing interval.

Examples of such a method may include one or more of the following features: causing the access terminal to operate on the first carrier in the first operational state and concurrently operate on the second carrier in the second operational state; setting a same burst length for the first carrier and the second carrier burst transmissions during inactive data transmission periods; setting a same time between bursts during an inactive data transmission period; identifying, for the first carrier and the second carrier, a same first time between bursts during a first inactive data transmission period and identifying, for the first carrier and the second carrier, a same second time, longer than the first time, between bursts during a second inactive data transmission period; or establishing a same inactivity threshold, wherein exceeding the inactivity threshold extends a time between bursts during an inactive data transmission period for a respective carrier of the plurality of carriers.

Also or alternatively, examples of such a method may include one or more of the following features: selecting the first carrier and second carrier because they are adjacent carriers; identifying the second operational state to be associated with a third carrier of the plurality of wireless carriers, and causing the third carrier in the second operational state in accordance with the common timing parameters; or, causing the second carrier to operate in the second operational state and the third carrier to operate concurrently in the second operational state. The method is performed by a base station controller or access terminal.

An exemplary base station controller for discontinuous multi-carrier uplink communication includes: a network interface configured to communicate with a wired communication network; a base transceiver station interface configured to communicate with one or more base transceiver stations; and a memory configured to store common timing parameters to be used in relation to discontinuous uplink transmissions on each of a plurality of wireless carriers usable for concurrent transmissions from an access terminal and store a plurality of operational states for performing discontinuous uplink transmissions from the access terminal. The exemplary base station controller further includes a processor configured to: identify, for a defined time duration, that first uplink transmissions will be performed from the access terminal on a first carrier of the plurality of wireless carriers in a first operational state of a plurality of operational states in accordance with the common timing parameters; and identify, for a defined time duration, that second uplink transmissions will be performed from the access terminal on a second carrier of the plurality of wireless carriers in a second operational state of a plurality of operational states in accordance with the common timing parameters. The processor of the base station controller may further be configured to cause the first operational state schedule information to be transmitted to the access terminal, and cause the second operational state schedule information to be transmitted to the access terminal.

DETAILED DESCRIPTION

Figure 1:
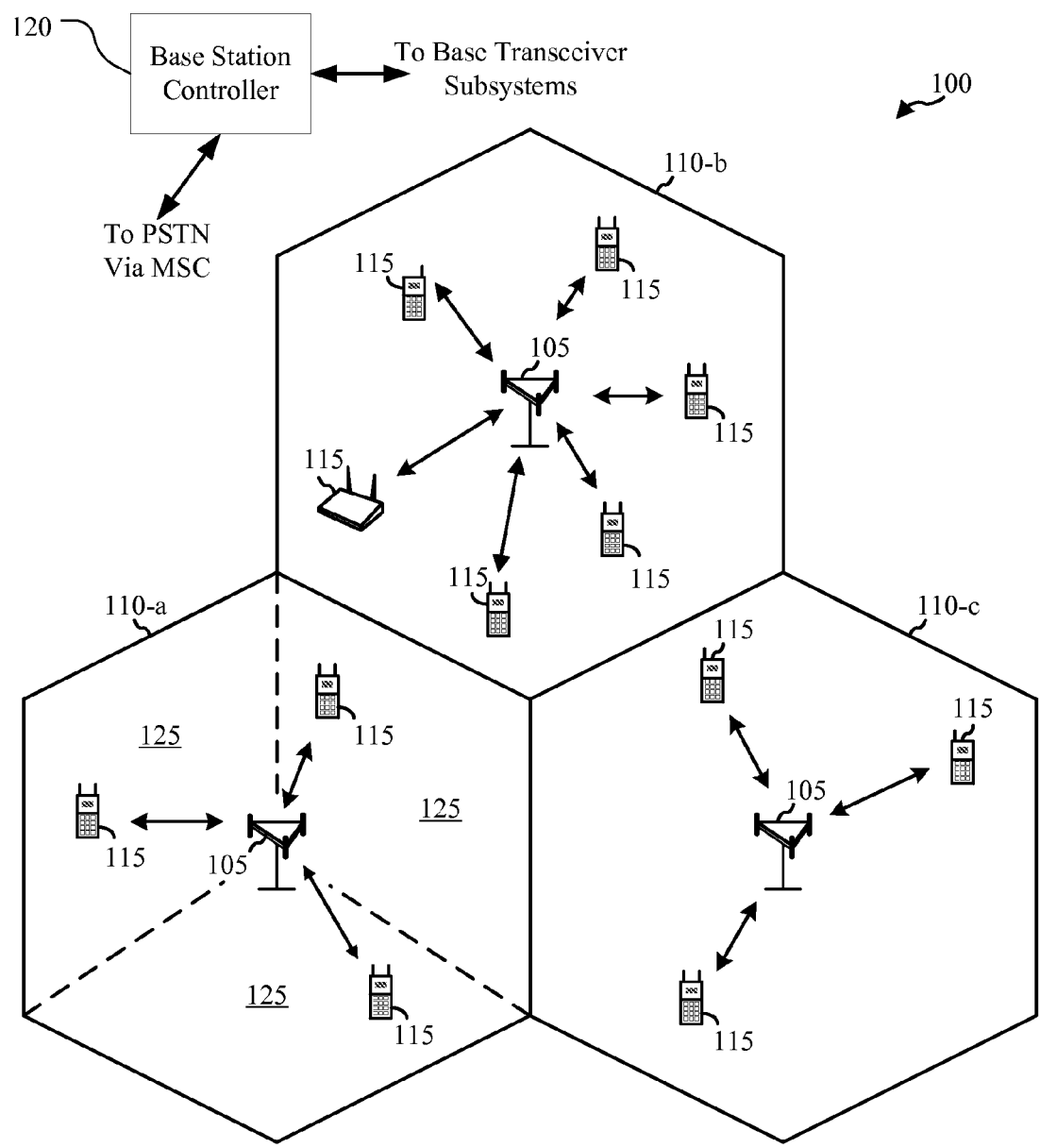
FIG. 1 is a block diagram of a wireless communication system.

Management of discontinuous multi-carrier uplink transmission in a wireless communication system is described. An access terminal may identify common timing parameters for use in relation to discontinuous uplink transmissions on each of two or more wireless carriers concurrently transmitting from an access terminal. A first operational state (e.g., a data transmitting state) is associated with a first wireless carrier, and a second, different state (e.g., a periodic burst state during an inactive data transmission period) is associated with a second wireless carrier. The first carrier may be operated in the first operational state concurrently with the second carrier being operated in the second operational state, with each carrier operated in accordance with the common timing parameters.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples. The following description uses the terms DTX and discontinuous transmission interchangeably.

Referring first to FIG. 1, a block diagram illustrates an example of a wireless communication system 100. The system 100 includes base transceiver stations (BTSs) 105, disposed in cells 110, mobile access terminals 115 (ATs), and a base station controller (BSC) 120. The system 100 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a SC-FDMA signal, etc. Each modulated signal may be sent on a different carrier and may carry pilot, overhead information, data, etc. In some examples, the system 100 is a multi-carrier LTE network capable of efficiently allocating network resources.

The BTSs 105 can wirelessly communicate with the ATs 115 via a base station antenna. The BTS 105 may also be referred to as an access point, an access node (AN), a Node B, an evolved Node B (eNB), etc. The BTSs 105 are configured to communicate with the ATs 115 under the control of the BSC 120 via multiple carriers. Each of the BTSs 105 can provide communication coverage for a respective geographic area, here the cell 110-*a*, 110-*b*, or 110-*c*. Each of the cells 110 of the BTSs 105 is partitioned into multiple (here three) sectors 125 (as shown in cell 110-*a*) as a function of the base station antenna 22. While FIG. 1 shows the sectors 125 as being sharply defined, with the ATs 115 being in only one sector 125 each, the sectors 125 overlap and a single AT 115 can be in multiple sectors 125 and multiple cells 110 simultaneously such that the BTSs 105 can communicate with the AT 115 through more than one sector 125 and more than one cell 110.

The system 100 may include only macro BTSs 105 or it can have BTSs 105 of different types, e.g., macro, pico, and/or femto base stations. A macro BTS 105 may cover a relatively large geographic area (e.g., several kilometers in radius) and may allow unrestricted access by terminals with service subscription. A pico BTS 105 may cover a relatively small geographic area (e.g., a pico cell) and may allow unrestricted access by terminals with service subscriptions. A femto or home BTS 105 may cover a relatively small geographic area (e.g., a femto cell) and may allow restricted access by terminals having association with the femto cell (e.g., terminals for users in a home).

The ATs 115 can be dispersed throughout the cells 110. The ATs 115 may be referred to as mobile stations, mobile devices, user equipment (UE), or subscriber units. The ATs 115 here include cellular phones and a wireless communication device, but can also include personal digital assistants (PDAs), other handheld devices, netbooks, notebook computers, etc.

As will be described in further detail herein, an AT 115 may identify common timing parameters for use on discontinuous uplink transmissions on each of two or more wireless carriers. A first operational state (e.g., a data transmitting state) may be associated with a first wireless carrier, and a second, different state (e.g., a periodic burst state during an inactive data transmission period) may be associated with a second wireless carrier. These different operational states may be operated concurrently, while sharing common timing parameters across carriers. An AT 115 may receive scheduling and control information identifying the common parameters, carriers, or states to be used from a BTS 105 or BSC 120 (e.g., via the BTS 105).

Figure 2:
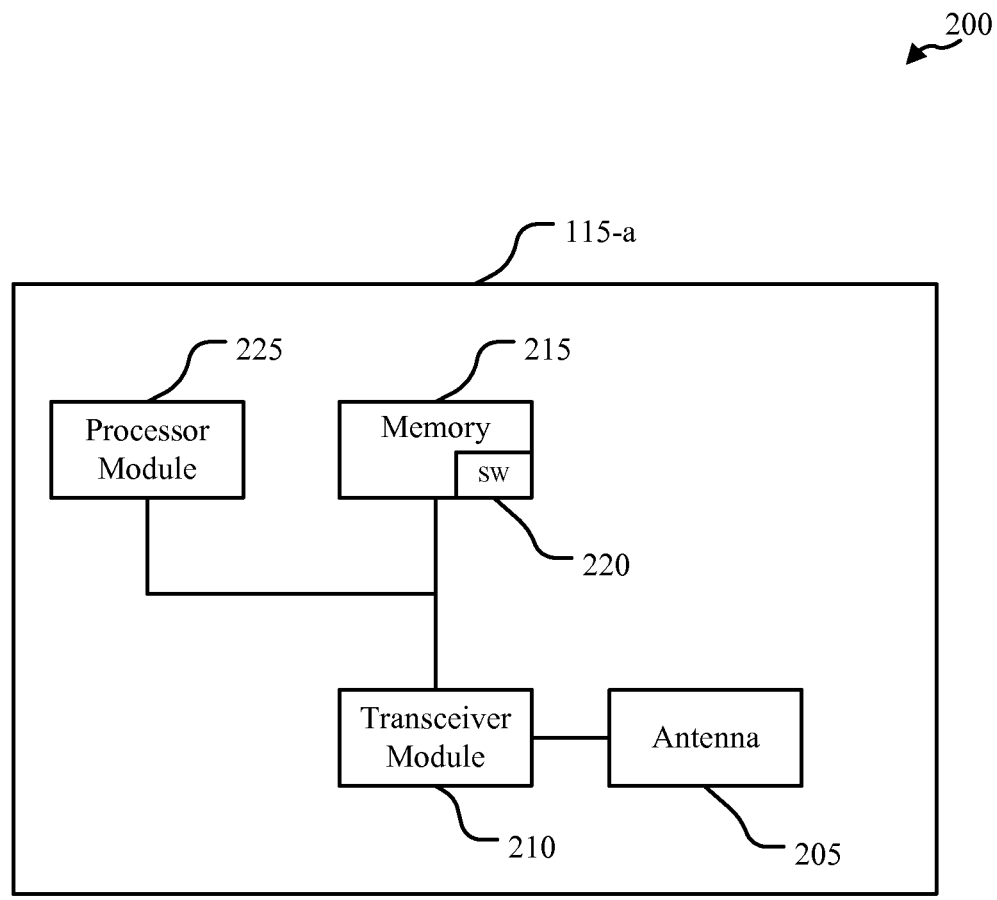
FIG. 2 is a block diagram of an access terminal for discontinuous multi-carrier uplink transmissions.

Referring next to FIG. 2, a block diagram 200 illustrates an example AT 115-*a*. This may, for example, be the AT 115 of FIG. 1. The AT 115-*a* includes an antenna 205, a transceiver module 210, memory 215, and a processor module 225, which each may be in communication, directly or indirectly, with each other. The transceiver module 210 is configured to communicate bi-directionally with the BTS 105. The memory 215 may include random access memory (RAM) and read-only memory (ROM). The memory 215 may store computer-readable, computer-executable software code 220 containing instructions that are configured to, when executed, cause the processor module 225 to perform various functions described herein. Alternatively, the software 220 may not be directly executable by the processor module 225 but is configured to cause the computer, e.g., when compiled and executed, to perform the functions.

The processor module 225 may include an intelligent hardware device, e.g., a central processing unit (CPU) such as those made by Intel® Corporation or AMD®, a microcontroller, an application specific integrated circuit (ASIC), etc. The processor module 225 may include a speech encoder (not shown) configured to receive audio via a microphone, convert the audio into packets (e.g., 20 ms in length) representative of the received audio, provide the audio packets to the transceiver module 210, and provide indications of whether a user is speaking. Alternatively, an encoder may only provide packets to the transceiver module 210, with the provision or withholding/suppression of the packet itself providing the indication of whether a user is speaking.

The transceiver module 210 may include a modem configured to modulate the packets and provide the modulated packets to the antenna 205 for transmission, and to demodulate packets received from the antenna 205. In some examples, the antenna 205 may be multiple antennas. The AT 115-*a* can communicate with the BTSs 105 via uplinks and downlinks using an active set of carriers. The downlink refers to the communication link from the BTS 105 to the AT 115-*a*, and the uplink refers to the communication link from the AT 115-*a* to the BTS 105. The active set of carriers is the set of carriers for which communication with a BTS 105 has been determined to be possible to a satisfactory degree.

The memory 215 may store data identifying common timing parameters for discontinuous uplink transmissions on each of a set of active wireless carriers for concurrent transmissions from the access terminal. The processor module 225 identifies a first operational state (e.g., a data transmitting state) for one of the uplink carriers and a different operational state (e.g., a discontinued data transmission state, or a periodic burst state during an inactive data transmission period) for a second one of the uplink carriers. These may be adjacent carriers, and there may be one or more additional carriers. The carriers may have a common and synchronized transmit timing interval. The processor module 225 is configured to cause the transceiver module 210 to operate concurrently on the first carrier in the first operational state and on the second carrier in the second operational state.

Thus, the operational states of the carriers in a discontinuous uplink may be different and independent of each other, while sharing common timing parameters for discontinuous uplink transmissions. By way of example, such common timing parameters may include timing parameters related to various stages of discontinuous uplink transmissions. When a particular carrier is operating in a discontinuous mode, the transceiver module 210 may continue to transmit bursts to maintain connection with the BTS 105 during periods of inactivity. This may allow for monitoring of the signal quality of that carrier. The common timing parameters may specify that each carrier use a same burst length for burst transmission during an inactive data transmission period. Similarly, the common timing parameters may specify that a same time between bursts be used during an inactive data transmission period. In another example, there may be a first, common time between bursts during a first inactive data transmission period, and a second longer, common time, between bursts during a second inactive data transmission period, the second inactive period occurring for a respective carrier when an inactivity timer exceeds a threshold. The threshold may be a shared inactivity threshold. There are a variety of common timing parameters that may be set for use across carriers, and these will be discussed in more detail below.

As noted, the transceiver module 210 may be configured to transmit on more than two uplink carriers. Thus, the processor module 225 may cause more than one carrier to operate in one of the operational states concurrently (e.g., specifying that multiple carriers operate in periodic burst states during an inactive data transmission period, and only one carrier operates in a data transmission state). Carriers, therefore, may operate in a same operational state at certain times, and with certain configurations. The processor module 225 may further be configured to receive schedule information for the operational states on each carrier, common timing parameter information, and other metrics (e.g., from a BTS 105 via the transceiver module 210).

Figure 3:
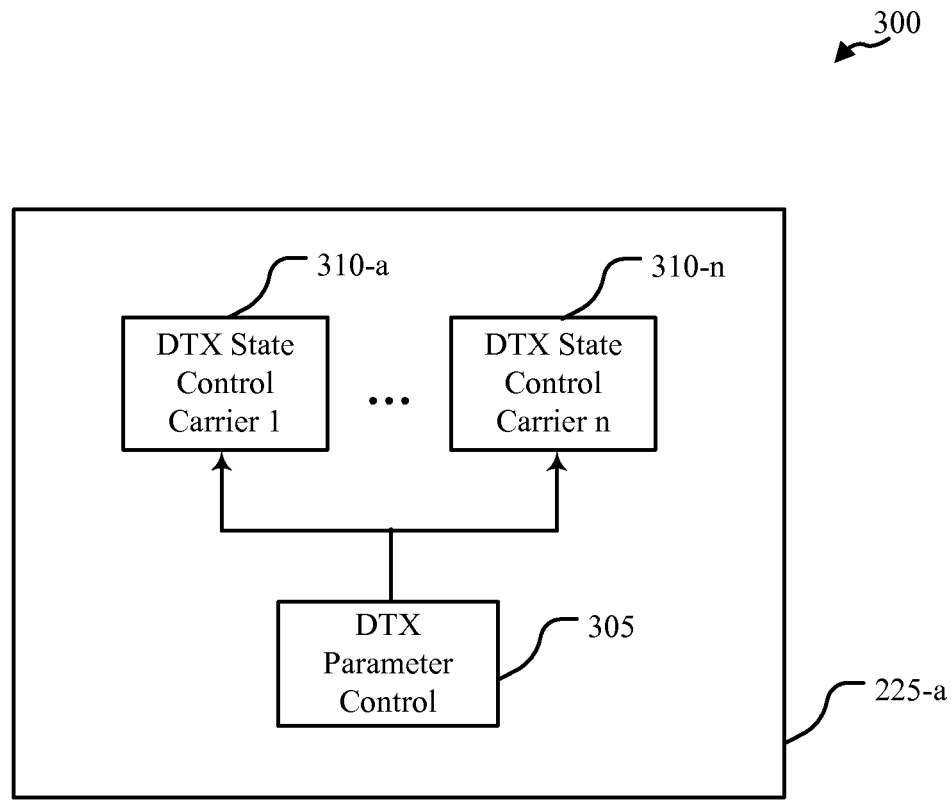
FIG. 3 is a block diagram of functional components of a processor for discontinuous multi-carrier uplink transmissions.

Referring next to FIG. 3, a block diagram 300 illustrates an example of certain components of a processor module 225-a. This processor module 225-a may be the processor module 225 of FIG. 2. The processor module 225-a includes a DTX parameter control module 305, and a number of DTX state control modules 310.

The DTX state control carrier modules 310 and the DTX parameter control module 305 may each be in communication with each other, directly or indirectly. The DTX parameter control module 305 and DTX state control modules 310 may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each module may include memory, or accessed memory may be elsewhere on (e.g., memory 215 of FIG. 2) on or off the processor module 225-a.

The DTX parameter control module 305 may identify common timing parameters (e.g., the common timing parameters discussed above) to be used in relation to discontinuous uplink transmissions on the wireless carriers usable for concurrent transmissions from an access terminal. A DTX state control module 310-a may identify a first operational state to be associated with a first carrier, and cause the first carrier to be operated in the first operational state in accordance with the common timing parameters. A second DTX state control module 310-a may identify a second operational state, different from the first operational state, to be associated with a second carrier, and cause the second carrier to be operated in the second operational state in accordance with the common timing parameters. Thus, different states of operation may run concurrently on different uplink carriers.

Memory on or off the processor module 225-a may store the common timing parameters to be used for discontinuous uplink transmissions, and store configuration and schedule information for the operational states on each carrier. Thus, the components of processor module 225-a may access the common timing parameter and state information in a number of ways.

Figure 4:
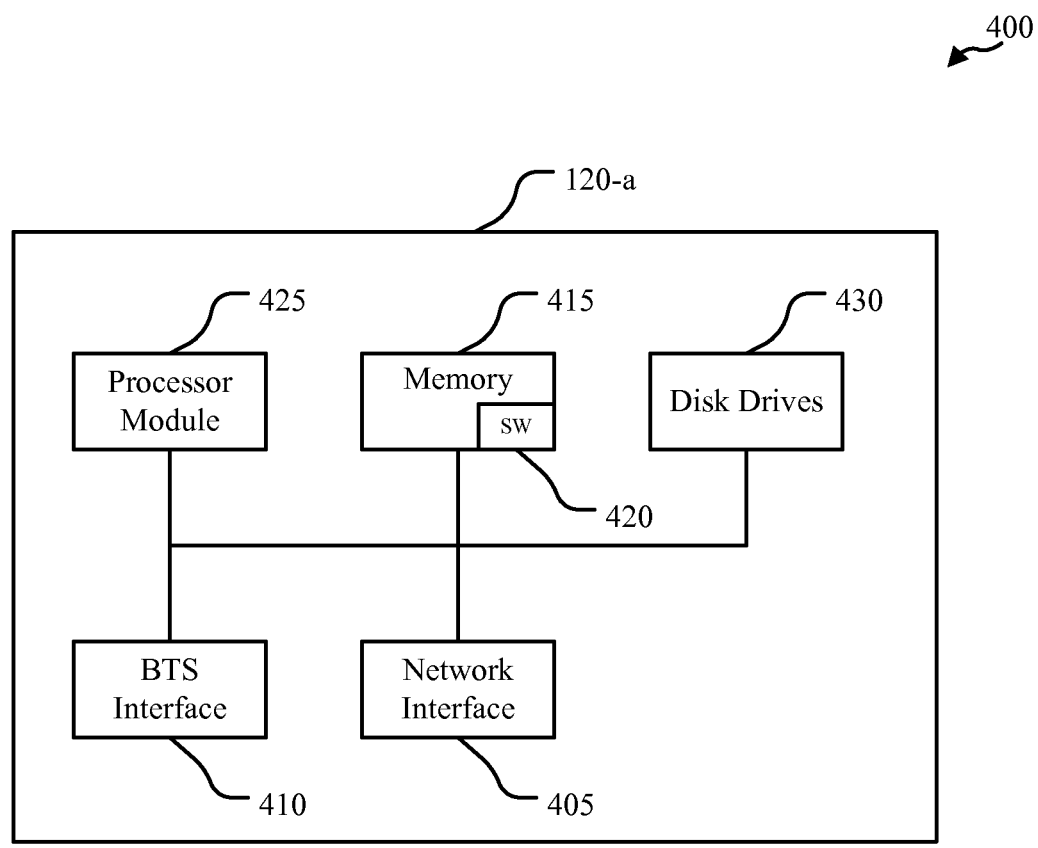
FIG. 4 is a block diagram of a base station controller for discontinuous multi-carrier uplink transmissions.

Referring next to FIG. 4, a block diagram 400 illustrates an example BSC 120-a. This may, for example, be the BSC 120 of FIG. 1. The BSC 120-a is a computer system including a network interface 405, a BTS interface 410, memory 415, a processor module 425, and disk drives 430. The BTS interface 410 includes the transmitter and receiver for transmitting, receiving, encoding, and decoding transmissions between the BSC 120-a and the BTSs (e.g., the BTSs 105 of FIG. 1). It is worth noting that one or more functions described for BSC 120-a may be performed by a BTS, and that the BSC 120-a may be integrated in varying degrees with a BTS. Thus, while in some examples the BSC 120-a may wirelessly communicate with and control a number if BTSs, there are a variety of ways this functionality may be integrated into a BTS.

The memory 415 includes random access memory (RAM) and read-only memory (ROM). The disk drives 430 may include a hard-disk drive and can include floppy-disk drives, a CD-ROM drive, and/or a zip drive. The network interface 405 includes appropriate hardware for bi-directional communication to and from a mobile switch center (MSC) that is in communication with a phone network such as a public-switched telephone network (PSTN). The BSC 120-a is connected and configured for bi-directional communication with BTSs. The BSC 120-a may be configured to convey, receive, encode, and decode transmissions to and from the BTSs using the BTS interface 410 and the processor module 425.

The processor module 425 may be an intelligent hardware device, e.g., a central processing unit (CPU) such as those made by Intel® Corporation or AMD®, a microcontroller, an application specific integrated circuit (ASIC), etc. The BSC 120-a stores, e.g., in the memory 415, computer-readable, computer-executable software code 420 containing instructions that are configured to, when executed, cause the processor module 425 to perform functions described below. Alternatively, the software 420 may not be directly executable by the processor module 425, but may be configured to cause the BSC 120-a, e.g., when compiled and executed, to perform the functions. The software 420 may be loaded onto the BSC 120-a, e.g., by being downloaded via a network connection, uploaded from a disk, etc.

The memory 415 may store common timing parameters to be used for concurrent discontinuous uplink transmissions on each of a number of wireless carriers from an AT (e.g., AT 115 of FIG. 1). These common timing parameters can be applied to a wider set of ATs, as well. The memory 415 may store signal quality data for the various carriers, scheduling and grant information, and configuration data for different operational states related to discontinuous uplink transmissions from the AT. The processor module 425 may access the scheduling and grant information and configuration data, and identify, for a defined time duration, that uplink transmissions will be performed from the AT on a first carrier in a first operational state (e.g., enabling a data transmitting state). The processor module 425 may further use the accessed information to identify, for the defined time duration, that uplink transmissions will be performed from the AT on a second carrier in a second operational state (e.g., a discontinued data transmission state, or a periodic burst state during an inactive data transmission period). The processor module 425 may trigger or otherwise cause the operational state schedule information to be transmitted to the AT via the BTS interface 410. The processor module 425 of the base station controller may trigger or otherwise cause common timing parameters to be transmitted to the AT via the BTS interface 410.

The processor module 425 may analyze aspects of a set of uplink carriers assigned to an AT engaged in multi-carrier communication. The analysis may include the frequency bands of the carriers, and whether the bands are adjacent in a frequency spectrum. Furthermore, the analysis may include transmit power and interference within a wireless network caused by uplink transmissions (e.g., pilot transmissions). Based on the analysis, carriers may be selected (or enabled)

for data transmission, or selected for discontinued transmission. These selections may then be used for scheduling purposes.

Figure 5:
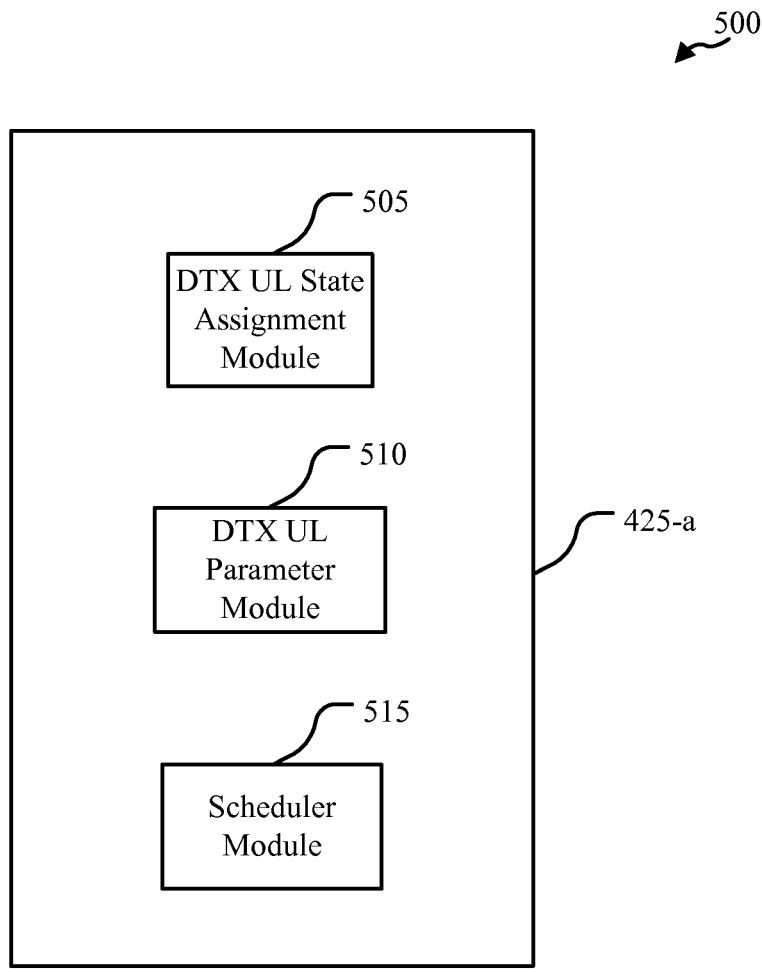
FIG. 5 is a block diagram of functional components of a processor configured to establish discontinuous multi-carrier uplink transmissions.

Referring next to FIG. 5, a block diagram 500 illustrates an example of certain components of a processor module 425-*a*. This processor module 425-*a* may be the processor module 425 of FIG. 4. The processor module 425-*a* includes a DTX UL state assignment module 505, a DTX UL parameter module 510, and a scheduler module 515, which may each be in communication with each other, directly or indirectly.

The DTX UL state assignment module 505, the DTX UL parameter module 510, and the scheduler module 515 may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each module may include memory, or accessed memory may be elsewhere on (e.g., memory 415 of FIG. 4) or off the processor module 425-*a*.

The DTX UL parameter module 510 may store, access, identify, and/or generate common timing parameters to be used for concurrent discontinuous uplink transmissions from wireless carriers from an AT (e.g., AT 115 of FIG. 1). These common timing parameters can be applied to a wider set of ATs, as well. The DTX UL state assignment module 505 may store, access, identify, and/or cause uplink transmissions to be performed from the AT on a first carrier in a first operational state (e.g., enabling a data transmitting state). The DTX UL state assignment module 505 may store, access, identify, and/or cause uplink transmissions to be performed from the AT on a second carrier in a second operational state (e.g., a discontinued data transmission state, or a periodic burst state during an inactive data transmission period). The scheduler module 515 may store, access, identify, and/or generate signal quality data for the various carriers, scheduling and grant information, and configuration data for different operational states related to discontinuous uplink transmissions from the AT. The processor module 425-*a* may trigger or otherwise cause the operational state schedule information, common timing parameters, or other information from the BSC 120 to be transmitted to an AT.

Figure 6:
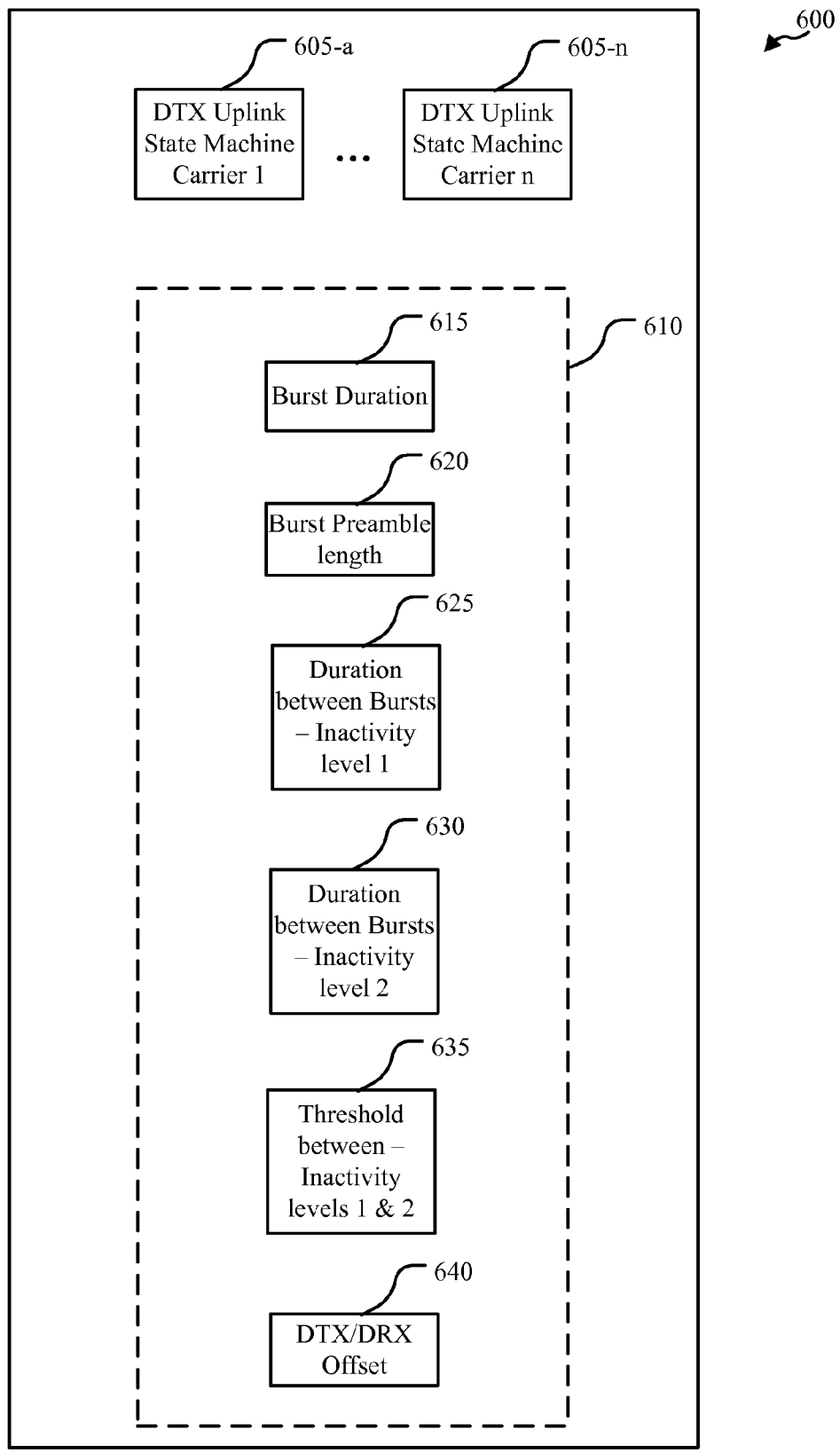
FIG. 6 is a block diagram illustrating contents of memory for managing discontinuous multi-carrier uplink transmissions.

Referring next to FIG. 6, a block diagram illustrates an example of data that may be stored in a memory 600. The memory 600 may, for example, be the memory 215 of FIG. 2 or the memory 415 of FIG. 4, and may include random access memory (RAM) and read-only memory (ROM). The memory 600 includes DTX uplink state machines 605 and common timing parameters 610. In the illustrated example, the common timing parameters 610 include burst duration data 615, burst preamble length data 620, duration between bursts—inactivity level 1 data 625, duration between bursts—inactivity level 2 data 630, threshold between—inactivity levels 1 & 2 data 635, and DTX/DRX offset data 640.

The data stored in memory 600 may be computer-readable, computer-executable software code containing instructions that are configured to, when executed, cause a processor to perform various functions described herein. Alternatively, the software may not be directly executable by the processor 225 but configured to cause a computer, e.g., when compiled and executed, to perform the functions. In other examples, the data may identify operating states and common timing parameters for one or more AT's, and thus the data need not include executable instructions.

DTX uplink state machines 605 may control and/or identify operational states to be used for two or more carriers used for transmission from an AT (e.g., AT 115 of FIG. 1). For each AT, DTX uplink state machines 605 may identify a first operational state for a first carrier and a different operational state for a second carrier. In other examples, there may be additional carriers, and the operational states for each carrier may be independent, or the operational states for some carriers may move in lock step. In some examples, a first carrier operates in a data transmitting state while a second operates in a discontinued data transmission state. In other examples, a first carrier operates in a data transmitting state while a second carrier operates in a periodic burst state during an inactive data transmission period. In still other examples, a first carrier operates in a discontinued transmission state associated with a first inactivity level while a second carrier operates in a discontinued transmission state associated with a second inactivity level. DTX uplink state machines 605 may have various inputs which control the operational state (e.g., state may be controlled based on signal quality for a given carrier, traffic on a given carrier, scheduling information received from a BSC, and/or the amount of data to be transmitted from an AT).

Common timing parameters 610 may be stored to be used by each carrier transmitting from an AT. Common timing parameters 610 include timing parameters related to various stages of discontinuous uplink transmissions. When a particular carrier is operating in a discontinuous mode, bursts may continue to be transmitted. The burst duration data 615 may specify a same burst length for each carrier for burst transmissions during an inactive data transmission period. The burst preamble length data 620 may specify a same burst preamble length for each carrier for burst transmissions during an inactive data transmission period. In some examples, the duration between bursts may vary depending upon how long the carrier has been inactive (i.e., not transmitting data). Thus, the duration between bursts—inactivity level 1 data 625 may specify a standard duration between bursts for all carriers during a first inactivity level. And the duration between bursts—inactivity level 2 data 630 may specify a standard duration between bursts for all carriers during a second inactivity level. The threshold between—inactivity levels 1 & 2 data 635 may specify a standard threshold between inactivity level 1 and 2 (note that in other examples, there may be additional inactivity levels (e.g., three or four inactivity levels). The DTX/DRX offset data 640 may specify that a same offset between discontinuous transmission and discontinuous reception be used for all uplink carries. These common timing parameters 610 are examples, and in other examples more, or fewer, timing parameters 610 may be shared. For example, burst duration or duration between bursts may be managed on a per-carrier basis in other examples.

The uplink carrier management described above may be used for DC-HSUPA (Dual-carrier—High Speed Uplink Packet Access) systems. Although not discussed in detail above, carriers may be selected for operational modes using a variety of criteria. As one example, where uplink interference is problematic for nearby ATs, an uplink mode that mitigates uplink interference may be selected. As another example, where excessive power consumption is problematic for the AT, an uplink carrier management mode minimizing AT power consumption can be employed. A carrier may also be selected by identifying the carrier with the better uplink power. Various hysteresis processes may be used to provide for stability. It should be appreciated that the subject disclosure is not limited to the foregoing examples, however.

As described above, respective uplink carriers may be operated at least in part independently, as they can concurrently operate in different operational states. For DC-HSUPA, enhanced dedicated channel (E-DCH) transmission conditions can be configured separately for each uplink carrier, and for DC-HSUPA. However, parameterization can be the same across the multiple uplink carriers. Table 1 sets forth an example for DC-HSUPA, wherein the parameters listed in the first column (on the left) are shared across each carrier of an AT (e.g., the AT 115 of FIG. 1), while each carrier is operating in different operational modes. The second column sets forth the applicable units of measure, and the third column identifies the values/value ranges for the parameters that may be the same across carriers:

TABLE 1

| | | |
|---|---|---|
| UE_DTX_cycle_1 | subframes | (1, 4, 5, 8, 10, 16, 20) 2 ms |
| | | (1, 5, 10, 20) 10 ms |
| UE_DTX_cycle_2 | subframes | (4, 5, 8, 10, 16, 20, 32, 40, 64, 80, 128, 160) 2 ms |
| | | (5, 10, 20, 40, 80, 160) 10 ms |
| UE_DRX_cycle | subframes | (4, 5, 8, 10, 16, 20) |
| UE_DTX_DRX_offset | subframes | 0 . . . 159 |
| Inactivity_threshold_for_UE_DTX_cycle_2 | E-DCH TTIs | (1, 4, 8, 16, 32, 64, 128, 256) |
| Default SG in DTX Cycle 2 | (0 . . . 37) = E-DCH serving grant index: 38 means zero grant. | (0 . . . 37.38) |
| Inactivity_threshold_for_UE_DRX_cycle | subframes | (0, 1, 2, 4, 8, 16, 32, 64, 128, 256, 512) |
| UE_DTX_long_preamble | slots | (2, 4, 15) |
| UE_DPCCH_burst_1 | subframes | (1, 2, 5) |
| UE_DPCCH_burst_2 | subframes | (1, 2, 5) |
| Uplink DPCCH slot format information | Enumerated | (1, 3, 4) |
| CPC Enabling Delay | Radio Frames | 0, 1, 2, 4, 8, 16, 32, 64, 128 |

Referring to specific common timing parameters of Table 1, the UE_DTX_cycle_1 and UE_DTX_cycle_2 parameters determine the Uplink DPCCH burst pattern. UE_DTX_cycle_1 may be the duration between bursts—inactivity level 1 625 parameter from FIG. 6, and the UE_DTX_cycle_2 may be the duration between bursts—inactivity level 2 630 parameter from FIG. 6.

The Inactivity_threshold_for_UE_DTX_cycle_2 defines a number of consecutive E-DCH TTIs without an E-DCH transmission, after which the AT 115 shall immediately move from UE_DTX_cycle_1 to using UE_DTX_cycle_2. The Inactivity_threshold_for_UE_DTX_cycle_2 parameter may be the threshold between—inactivity levels 1 & 2 635 parameter from FIG. 6.

The UE_DTX_long_preamble determines in slots the length of the preamble associated with the UE_DTX_cycle_2. The UE_DTX_long_preamble may be the burst preamble length 620 parameter from FIG. 6. UE_DPCCH_burst_1 determines the Uplink DPCCH burst length in subframes, when UE_DTX_cycle_1 is applied, and UE_DPCCH_burst_2 determines the Uplink DPCCH burst length in subframes, when UE_DTX_cycle_2 is applied. UE_DPCCH_burst_1 and UE_DPCCH_burst_2 may, individually or collectively, be the burst duration 615 parameter from FIG. 6.

UE_DTX_DRX_offset determines the Uplink DPCCH burst pattern and HS-SCCH reception pattern offset in subframes. The UE_DTX_DRX_offset may be the DTX/DRX offset 640 parameter of FIG. 6. Those skilled in the art will recognize the remainder of the common timing parameters set forth in Table 1 above, and note that they may be the same across carriers. In some examples, fewer than all of the common timing parameters set forth in Table 1 are shared across carriers, while in other examples additional common timing parameters not set forth in Table 1 are shared across carriers.

Common timing parameters may, therefore, specify a same burst and preamble length for each carrier for burst transmissions during an inactive data transmission period. These same burst and preamble lengths may differ for different inactivity levels. Common timing parameters may specify a same duration between bursts; this duration may be set differently at different inactivity levels. Common timing parameters may specify a standard threshold between inactivity levels, as well.

Figure 7:
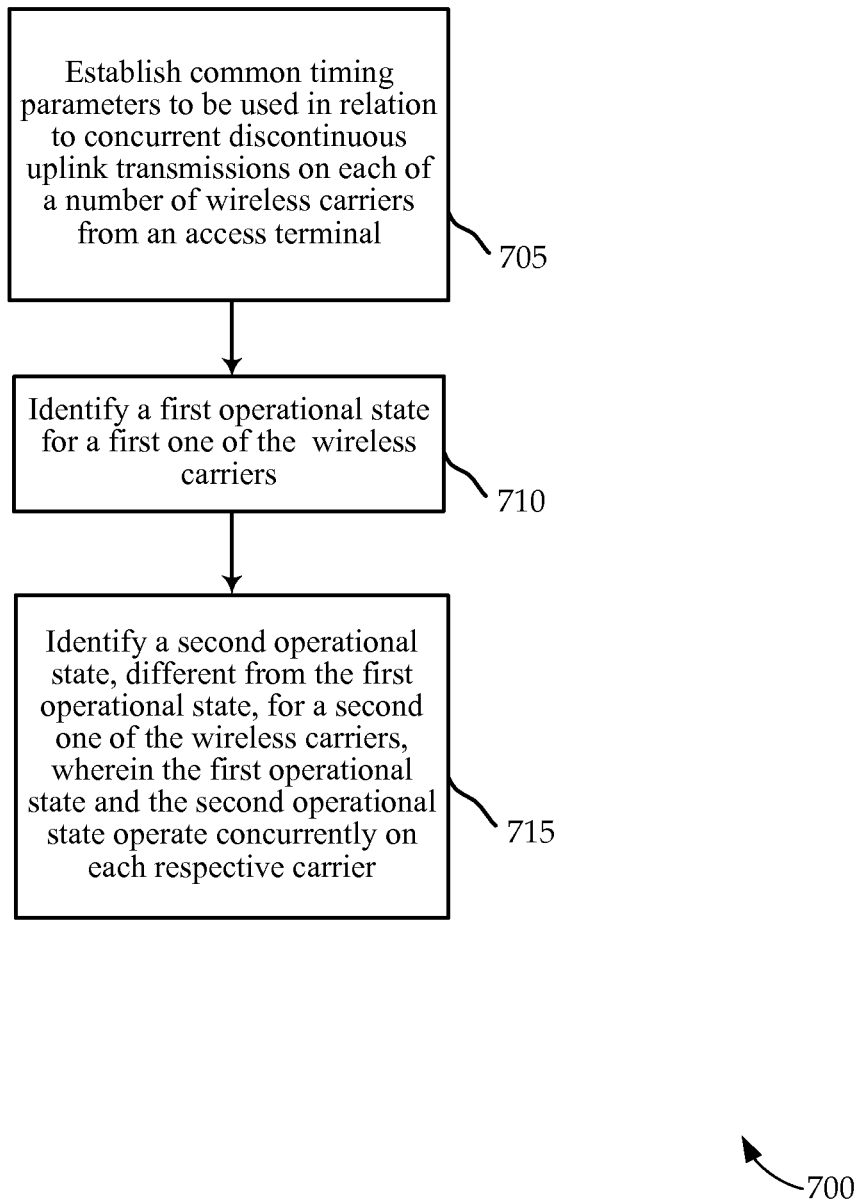
FIG. 7 is a flowchart of a method for discontinuous uplink transmissions.

FIG. 7 is a flowchart of a method 700 for discontinuous uplink transmissions. The method 700 may be performed, for example, in whole or in part, by the AT 115 of FIG. 1 or 2, or more specifically, by the processor module 225 of FIG. 2 or 3. The method 700 may be performed, in whole or in part, by the BSC 120 of FIG. 1 or 4, the processor module 425 of FIG. 4 or 5, or the BTS 105 of FIG. 1.

At stage 705, common timing parameters are established for concurrent discontinuous uplink transmissions on each of a number of wireless carriers from an access terminal. At stage 710, a first operational state is identified for a first one of the wireless carriers. At stage 715, a second operational state, different from the first operational state, is identified for a second one of the wireless carriers, wherein the first operational state and the second operational state operate concurrently on each respective carrier.

Figure 8:
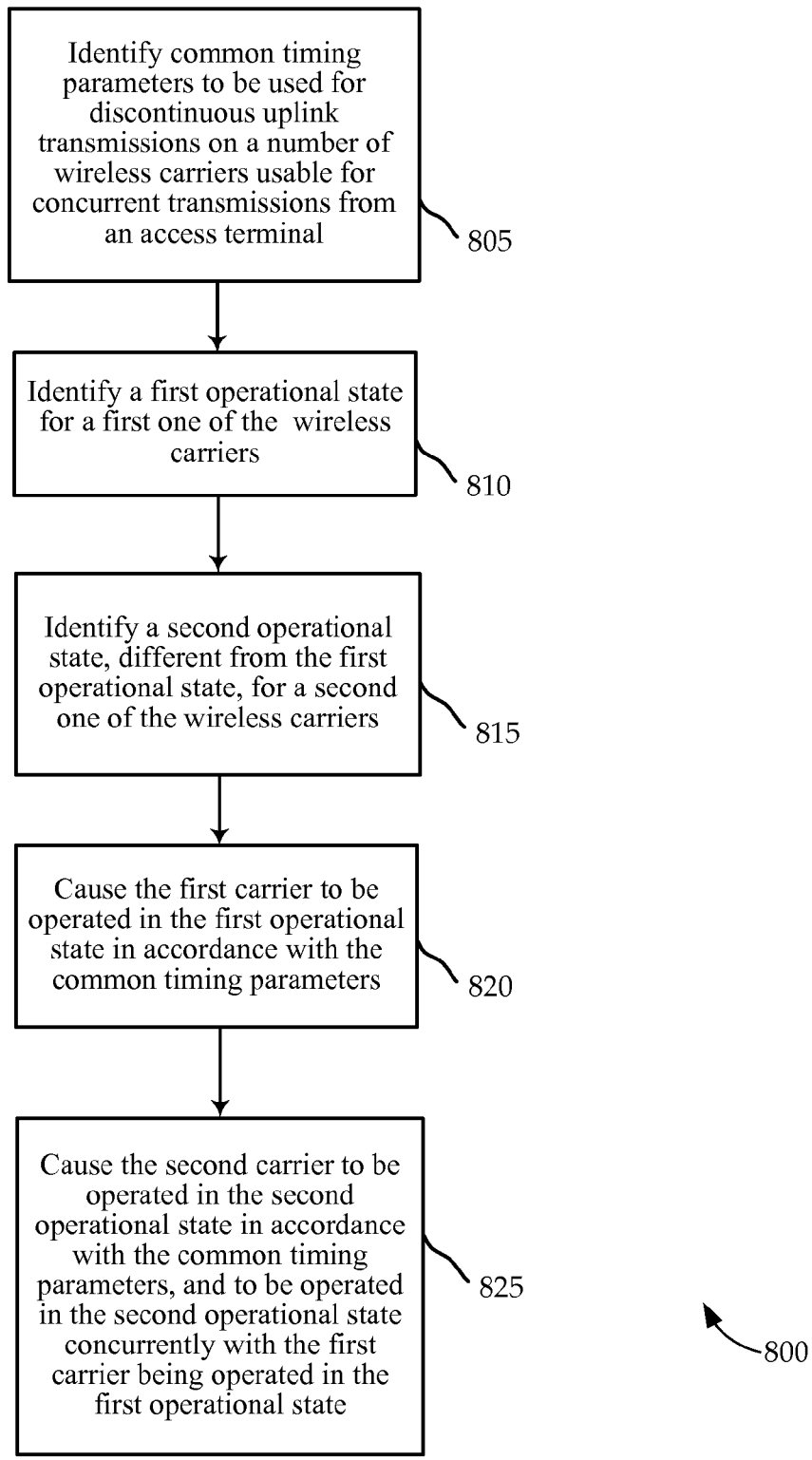
FIG. 8 is a flowchart of a method for management of multi-carrier discontinuous uplink transmissions.

FIG. 8 is a flowchart of a method 800 for management of multi-carrier discontinuous uplink transmissions. The method 800 may be performed, for example, in whole or in part, by the AT 115 of FIG. 1 or 2, or more specifically, by the processor module 225 of FIG. 2 or 3. One or more aspects of the method 800 may be performed, in whole or in part, by the BSC 120 of FIG. 1 or 4, the processor module 425 of FIG. 4 or 5, or the BTS 105 of FIG. 1.

At stage 805, common timing parameters are identified for discontinuous uplink transmissions on a number of wireless carriers usable for concurrent transmissions from an access terminal. At stage 810, a first operational state is identified for a first one of the wireless carriers. At stage 815, a second operational state, different from the first operational state, is identified for a second one of the wireless carriers. At stage 820, the first carrier is caused to be operated in the first operational state in accordance with the common timing parameters. At stage 825, the second carrier is caused to be operated in the second operational state in accordance with the common timing parameters, the second carrier operated in the second operational state concurrently with the first carrier being operated in the first operational state.

Figure 9:
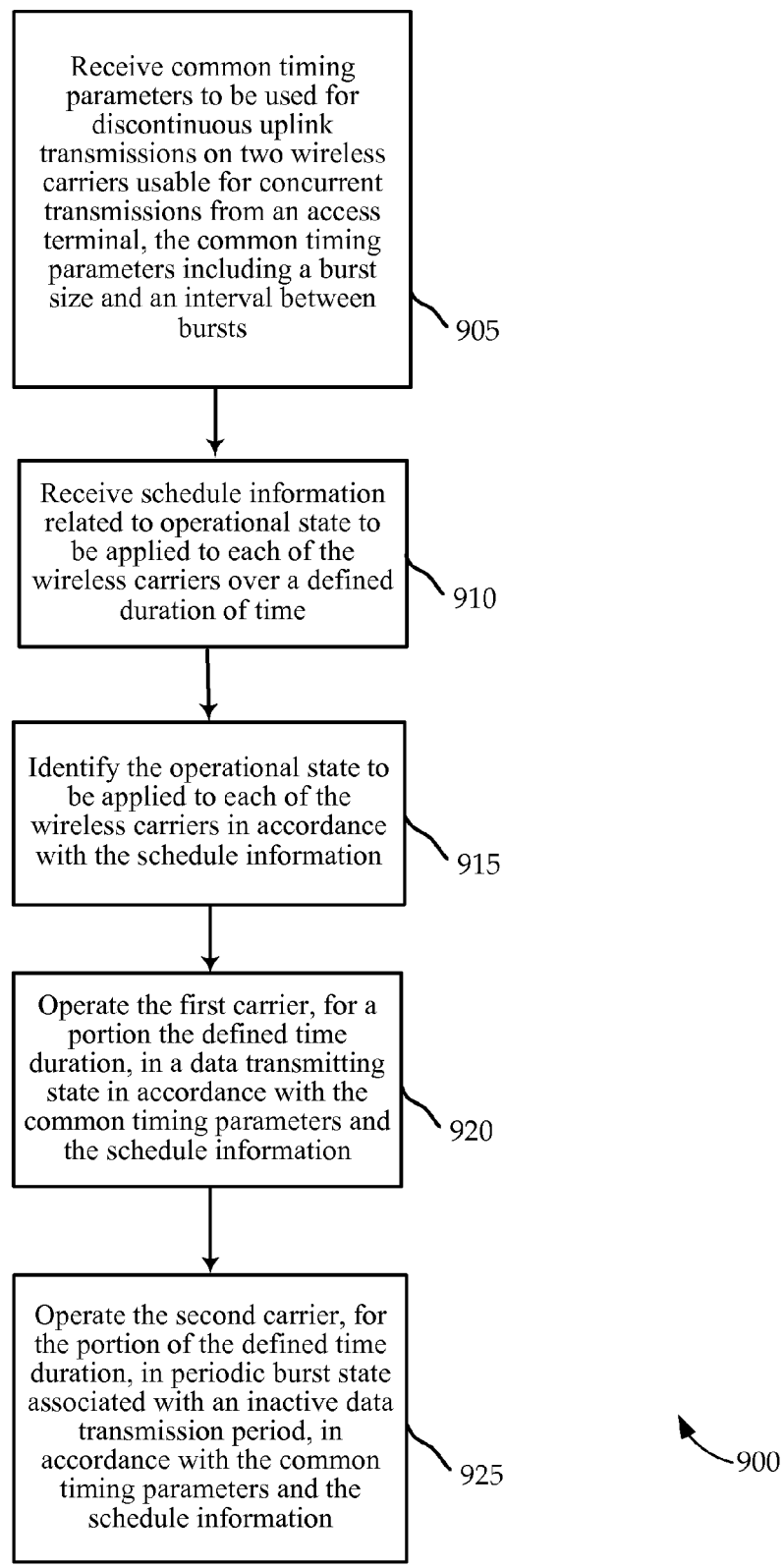
FIG. 9 is a flowchart of a method for management of multi-carrier discontinuous uplink transmissions from an access terminal.

FIG. 9 is a flowchart of a method 900 for management of multi-carrier discontinuous uplink transmissions from an access terminal. The method 900 may be performed, for example, in whole or in part, by the AT 115 of FIG. 1 or 2, or more specifically, by the processor module 225 of FIG. 2 or 3.

At stage 905, common timing parameters are received for discontinuous uplink transmissions on two wireless carriers usable for concurrent transmissions from an access terminal, the common timing parameters including a burst size and an interval between bursts. At stage 910, schedule information related to the operational state is received to be applied to each of the wireless carriers over a defined duration of time. At stage 915, the operational state to be applied to each of the wireless carriers is identified in accordance with the schedule information.

At stage 920, the first carrier is operated for a portion of the defined time duration in a data transmitting state in accordance with the common timing parameters and the schedule information. At stage 925, the second carrier is operated for the portion of the defined time duration in a periodic burst state during an inactive data transmission period, in accordance with the common timing parameters and the schedule information.

UMTS Description

Figure 10:
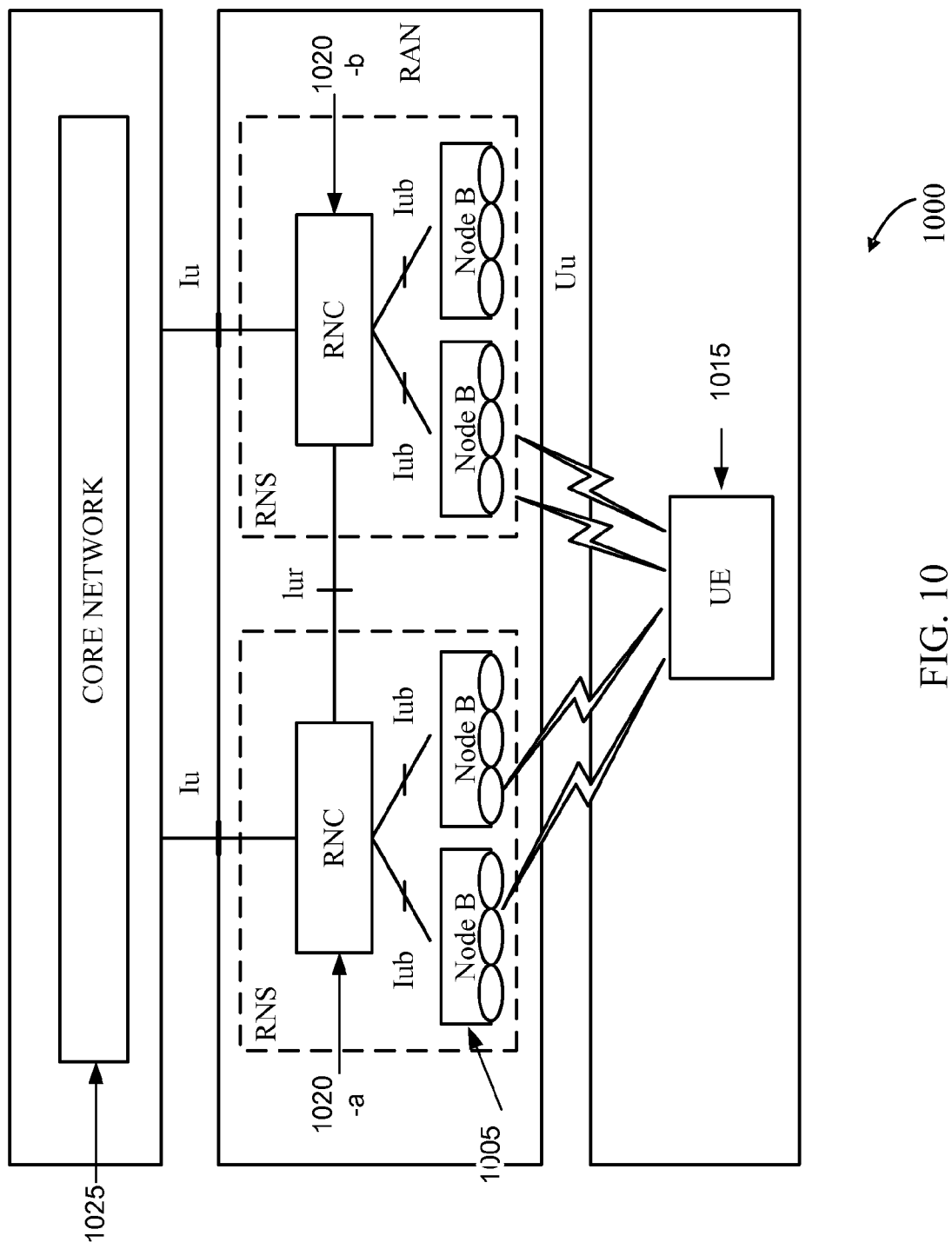
FIG. 10 is a block diagram of a radio access system having two radio network subsystems along with its interfaces to core and user equipment.

Further described herein with reference to FIGS. 10-14 is an example of a radio network 1000 (which may be the system 100 of FIG. 1) operating according to UMTS in which the principles of the disclosure may be applied. Turning first to FIG. 10, Node Bs 1005 (which may be the BTSs 105 of FIG. 1) and radio network controllers (RNCs) 1020 (which may be the BSCs 120 of FIG. 1 or 4) are parts of the radio network 1000. The radio network may be a UMTS Terrestrial Radio Access Network (UTRAN). A UMTS Terrestrial Radio Access Network (UTRAN) is a collective term for the Node Bs 1005 (or base stations) and the control equipment for the Node Bs 1005 (or RNC 1020) it contains which make up the UMTS radio access network. This is a 3 G communications network which can carry both real-time circuit switched and IP-based packet-switched traffic types. The UTRAN provides an air interface access method for the user equipment (UE) 1015 (which may be the ATs 115 of FIG. 1 or 2). Connectivity is provided between the UE 1015 and the core network 1025 by the UTRAN. The radio network 1000 may transport data packets between multiple UEs 1015.

The UTRAN is connected internally or externally to other functional entities by four interfaces: Iu, Uu, Iub and Iur. The UTRAN is attached to a GSM core network 1025 via an external interface called Iu. RNCs 1020 support this interface. In addition, the RNCs 1020 manage a set of base stations called Node Bs 1005, through interfaces labeled Iub. The Iur interface connects the two RNCs 1020-a, 1020-b with each other. The UTRAN is largely autonomous from the core network 1025 since the RNCs 1020 are interconnected by the Iur interface. FIG. 10 discloses a communication system which uses the RNC 1020, the Node Bs 1005 and the Iu and Uu interfaces. The Uu is also external and connects the Node Bs 1005 with the UE 1015, while the Iub is an internal interface connecting the RNCs 1020 with the Node Bs 1005.

The radio network 1000 may be further connected to additional networks outside the radio network 1000, such as a corporate intranet, the Internet, or a conventional public switched telephone network as stated above, and may transport data packets between each UE device 1015 and such outside networks.

Figure 11:
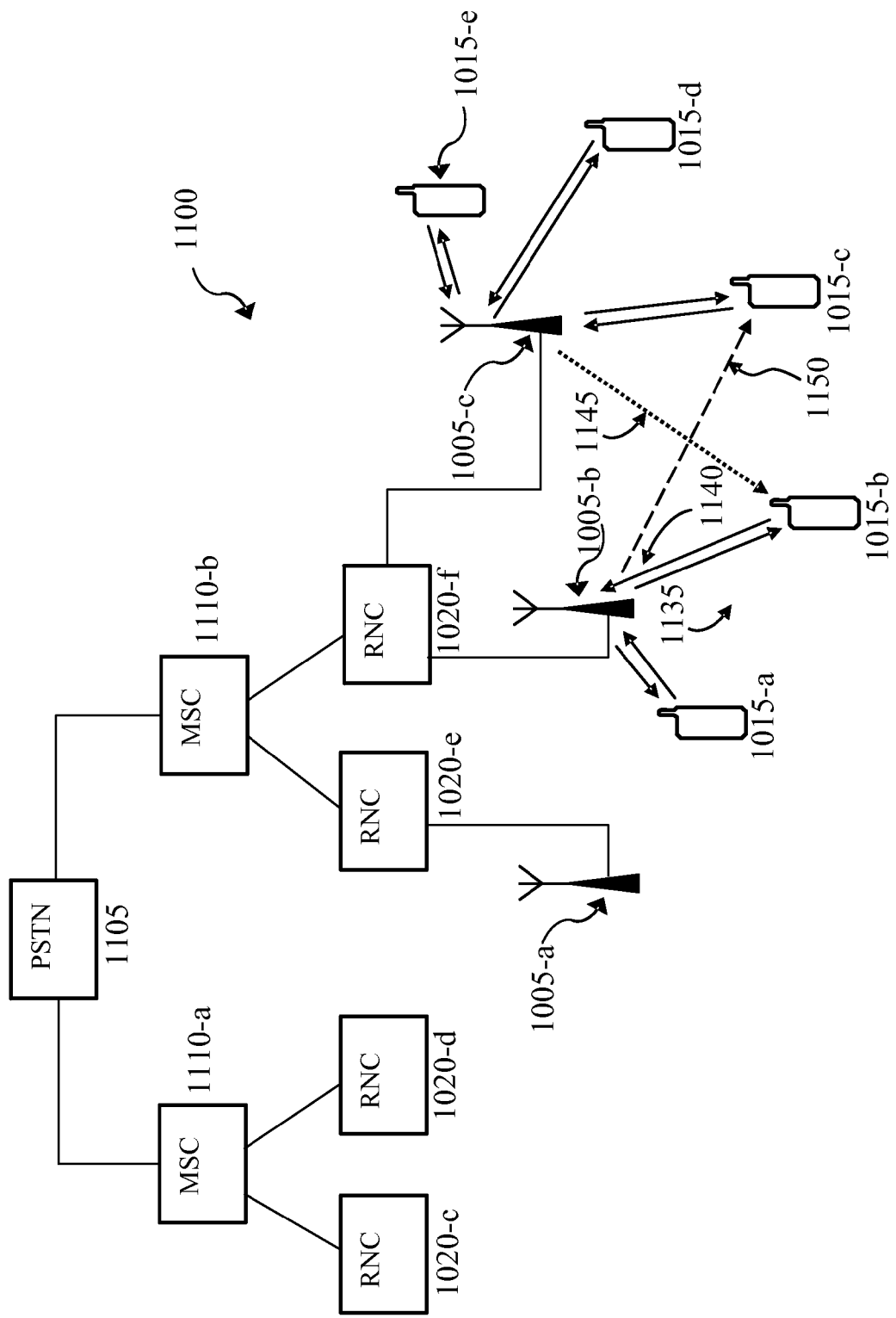
FIG. 11 is a simplified representation of a cellular communications system.

FIG. 11 illustrates selected components of a communication network 1100. Communication network 1100 includes RNCs 1020 coupled to Node Bs 1005. As noted above, Node Bs 1005 may be the BTSs 105 of FIG. 1, and RNCs 1020 may be the BSCs 120 of FIG. 1 or 4. The Node Bs 1005 communicate with UEs 1015 through corresponding wireless connections 1135, 1140, 1145, 1150. As described above, a communications channel includes a forward link (FL) (also known as a downlink) 1135 for transmissions from the Node Bs 1005 to the UE 1015, and a reverse link (RL) (also known as an uplink) 1140 for transmissions from the UE 1015 to the Node Bs 1005. Much of the functionality described throughout the disclosure relates to discontinuous transmissions on the uplink. The RNCs 1020 provide control functionalities for one or more Node Bs 1005. The RNCs 1020 are coupled to a public switched telephone network (PSTN) 1105 through mobile switching centers (MSC) 1110. In another example, the RNCs 1020 are coupled to a packet switched network (PSN) (not shown) through a packet data server node (PDSN) (not shown). Data interchange between various network elements, such as the RNCs 1020 and a packet data server node, can be implemented using any number of protocols, for example, the Internet Protocol (IP), an asynchronous transfer mode (ATM) protocol, T1, E1, frame relay, or other protocols.

Each RNC 1020 fills multiple roles. First, it may control the admission of new UEs 1015 or services attempting to use the Node B 1005. Second, from the Node B 1005, or base station, point of view, the RNC 1020 is a controlling RNC 1020. Controlling admission ensures that UEs 1015 are allocated radio resources (bandwidth and signal/noise ratio) up to what the network has available. The RNC 1020 is where the Node B's Iub interface terminates. From the UE 1015 point of view, the RNC 1020 acts as a serving RNC 1020 in which it terminates the UE's 1015 link layer communications. From a core network point of view, the serving RNC 1020 terminates the Iu for the UE 1015. The serving RNC 1020 also controls the admission of new UEs 1015 or services attempting to use the core network over its Iu interface.

For an air interface, UMTS most commonly uses a wideband spread-spectrum mobile air interface known as Wideband Code Division Multiple Access (or W-CDMA). W-CDMA uses a direct sequence code division multiple access signaling method (or CDMA) to separate users. W-CDMA is a third generation standard for mobile communications. W-CDMA evolved from GSM (Global System for Mobile Communications)/GPRS a second generation standard, which is oriented to voice communications with limited data capability. The first commercial deployments of W-CDMA are based on a version of the standards called W-CDMA Release 99.

The Release 99 specification defines two techniques to enable uplink packet data. Most commonly, data transmission is supported using either the Dedicated Channel (DCH) or the Random Access Channel (RACH). However, the DCH is the primary channel for support of packet data services. Each UE 1015 uses an orthogonal variable spreading factor (OVSF) code. An OVSF code is an orthogonal code that facilitates uniquely identifying individual communication channels. In addition, micro diversity is supported using soft handover and closed loop power control is employed with the DCH.

Pseudorandom noise (PN) sequences are commonly used in CDMA systems for spreading transmitted data, including transmitted pilot signals. The time required to transmit a single value of the PN sequence is known as a chip, and the rate at which the chips vary is known as the chip rate. Inherent in the design of direct sequence CDMA systems is that a receiver aligns its PN sequences to those of the Node Bs 1005. Some systems, such as those defined by the W-CDMA standard, differentiate Node Bs 1005 using a unique PN code for each, known as a primary scrambling code. The W-CDMA standard defines two Gold code sequences for scrambling the downlink, one for the in-phase component (I) and another for the quadrature (Q). The I and Q PN sequences together are broadcast throughout the cell without data modulation. This broadcast is referred to as the common pilot channel (CPICH). The PN sequences generated are truncated to a length of 38,400 chips. The period of 38,400 chips is referred to as a radio frame. Each radio frame is divided into 15 equal sections referred to as slots. W-CDMA Node Bs 1005 operate asynchronously in relation to each other, so knowledge of the frame timing of one Node B 1005 does not translate into knowledge of the frame timing of any other Node B 1005. In order to acquire this knowledge, W-CDMA systems use synchronization channels and a cell searching technique.

3GPP Release 5 and later supports High-Speed Downlink Packet Access (HSDPA). 3GPP Release 6 and later supports High-Speed Uplink Packet Access (HSUPA). HSDPA and HSUPA are sets of channels and procedures that enable high-speed packet data transmission on the downlink and uplink, respectively. Release 7 HSPA+ uses three enhancements to improve data rate. First, it introduced support for 2×2 MIMO on the downlink. With MIMO, the peak data rate supported on the downlink is 28 Mbps. Second, higher order modulation is introduced on the downlink. The use of 64 QAM on the downlink allows peak data rates of 21 Mbps. Third, higher order modulation is introduced on the uplink. The use of 16 QAM on the uplink allows peak data rates of 11 Mbps.

In HSUPA, the Node B 1005 allows several UEs 1015 to transmit at a certain power level at the same time. These grants are assigned to users by using a fast scheduling algorithm that allocates the resources on a short-term basis (every tens of ms). The rapid scheduling of HSUPA is well suited to the bursty nature of packet data. During periods of high activity, a user may get a larger percentage of the available resources, while getting little or no bandwidth during periods of low activity.

In 3GPP Release 5 HSDPA, a Node B 1005 of an access network sends downlink payload data to UEs 1015 on High Speed Downlink Shared Channel (HS-DSCH), and the control information associated with the downlink data on High Speed Shared Control Channel (HS-SCCH). There are 256 Orthogonal Variable Spreading Factor (OVSF or Walsh) codes used for data transmission. In HSDPA systems, these codes are partitioned into release 1999 (legacy system) codes that are typically used for cellular telephony (voice), and HSDPA codes that are used for data services. For each transmission time interval (TTI), the dedicated control information sent to an HSDPA-enabled UE 1015 indicates to the device which codes within the code space will be used to send downlink payload data (data other than control data of the radio network) to the device, and the modulation that will be used for transmission of the downlink payload data.

With HSDPA operation, downlink transmissions to the UEs 1015 may be scheduled for different transmission time intervals using the 15 available HSDPA OVSF codes. For a given TTI, each UE 1015 may be using one or more of the 15 HSDPA codes, depending on the downlink bandwidth allocated to the device during the TTI.

In a MIMO system, there are N (# of transmitter antennas) by M (# of receiver antennas) signal paths from the transmit and the receive antennas, and the signals on these paths are not identical. MIMO creates multiple data transmission pipes. The pipes are orthogonal in the space-time domain. The number of pipes equals the rank of the system. Since these pipes are orthogonal in the space-time domain, they create little interference with each other. The data pipes are realized with proper digital signal processing by properly combining signals on the N×M paths. A transmission pipe does not correspond to an antenna transmission chain or any one particular transmission path.

Communication systems may use a single carrier frequency or multiple carrier frequencies. Each link may incorporate a different number of carrier frequencies. Furthermore, a UE 1015 may be any data device that communicates through a wireless channel or through a wired channel, for example using fiber optic or coaxial cables. A UE 1015 may be any of a number of types of devices including but not limited to PC card, compact flash, external or internal modem, or wireless or wireline phone.

UE 1015 that has established an active traffic channel connection with one or more Node Bs 1005 is called active UE 1015, and is said to be in a traffic state. UE 1015 that is in the process of establishing an active traffic channel connection with one or more Node Bs 1005 is said to be in a connection setup state. The communication link through which the UE 1015 sends signals to the Node Bs 1005 is called an uplink 1035. The communication link through which Node Bs 1005 send signals to a UE 1015 is called a downlink 1040.

Figure 12:
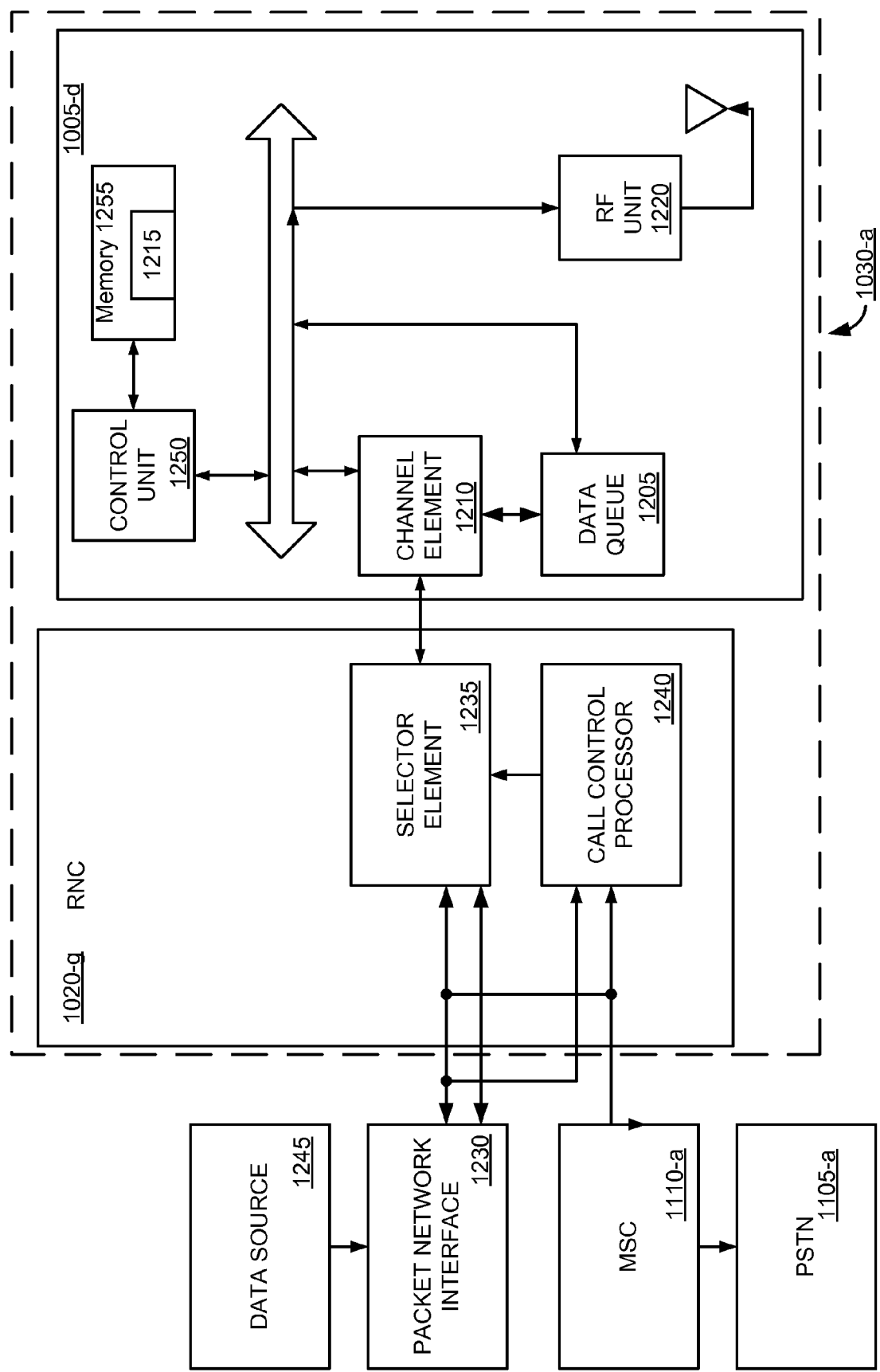
FIG. 12 is a block diagram of a portion of the communication system where a Node B and a radio network controller interface with a packet network interface.

FIG. 12 is detailed herein below, and provides an example wherein a Node B 1005-*d* (which may be a BTS 105 of FIG. 1) and RNC 1020-*g* (which may be the BSC 120 of FIG. 1 or 4) are in communication with a packet network interface 1230. (In FIG. 12, only one of the Node Bs 1005 and only one RNC 1020 is shown for simplicity). The Node B 1005-*d* and RNC 1020-*g* may be part of a radio network 1030-*a*, shown in FIG. 12 as a dotted line surrounding one or more Node Bs 1005 and the RNC 1020. The associated quantity of data to be transmitted is retrieved from a data queue 1205 in the Node B 1005-*d* and provided to the channel element 1210 for transmission to the UE 1015 associated with the data queue 1205.

The RNC 1020-*g* interfaces with the Public Switched Telephone Network (PSTN) 1105-*a* through a mobile switching center 1110-*a*. Also, RNC 1020-*g* interfaces with Node Bs 1005 in the radio network 1000 (only one Node B 1005 is shown in FIG. 12 for simplicity). In addition, the RNC 1020-*g* interfaces with a packet network interface 1230. The RNC 1020-*g* coordinates the communication between the UE 1015 in the radio network 1000 and other users connected to packet network interface 1230 and PSTN 1105-*a*. The PSTN 1105-*a* interfaces with users through a standard telephone network (not shown in FIG. 12).

The RNC 1020-*g* contains many selector elements 1235, although only one is shown in FIG. 12 for simplicity. Each selector element 1235 is assigned to control communication between one or more Node Bs 1005 and one UE 1015 (not shown). If the selector element 1235 has not been assigned to a given UE 1015, a call control processor 1240 is informed of the desire to page the UE 1015. The call control processor 1240 directs the Node B 1005-*d* to page the UE 1015.

Data source 1245 contains a quantity of data which is to be transmitted to a given UE 1015. The data source 1245 provides the data to the packet network interface 1230. The packet network interface 1230 receives the data and routes the data to the selector element 1235. The selector element 1235 transmits the data to the Node B 1005-*d* in communication with the target UE 1015. In the exemplary example, each Node B 1005 maintains a data queue 1205 which stores the data to be transmitted to the UE 1015.

For each data packet, a channel element 1210 inserts the necessary control fields. The channel element 1210 performs a cyclic redundancy check, CRC, encoding of the data packet and control fields and inserts a set of code tail bits. The data packet, control fields, CRC parity bits, and code tail bits comprise a formatted packet. The channel element 1210 encodes the formatted packet and interleaves (or reorders) the symbols within the encoded packet. The interleaved packet is covered with a Walsh code, and spread with the short PNI and PNQ codes. The spread data is provided to RF unit 1220 which quadrature modulates, filters, and amplifies the signal. The downlink signal is transmitted over the air through an antenna to the downlink. The memory 1255 of Node B 1005-d may include random access memory (RAM) and read-only memory (ROM). The control unit 1250 may be an intelligent hardware device, e.g., a central processing unit (CPU) such as those made by Intel® Corporation or AMD®, a microcontroller, an application specific integrated circuit (ASIC), etc. The Node B 1005-d may store, e.g., in the memory 1255, computer-readable, computer-executable software code 1215 containing instructions that are configured to, when executed, cause the control unit 1250 to perform Node B functionality described herein.

At the UE 1015, the downlink signal is received by an antenna and routed to a receiver. The receiver filters, amplifies, quadrature demodulates, and quantizes the signal. The digitized signal is provided to a demodulator (DEMOD) where the digitized signal is despread with the short PNI and PNQ codes and decovered with the Walsh cover. The demodulated data is provided to a decoder which performs the inverse of the signal processing functions done at the Node B 1005-d, specifically the de-interleaving, decoding, and CRC check functions. The decoded data is provided to a data sink.

Figure 13:
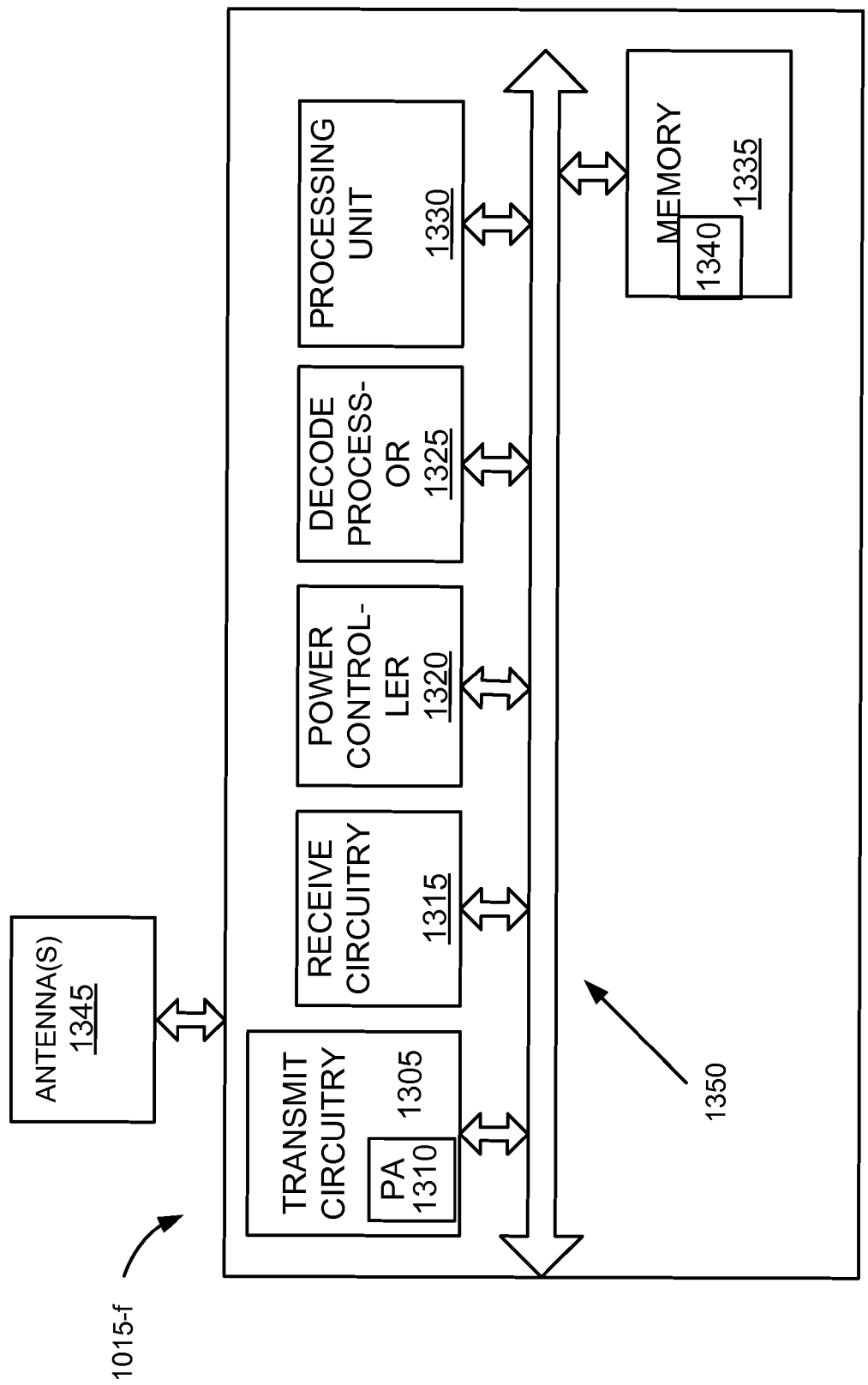
FIG. 13 is a block diagram of the user equipment (UE).

FIG. 13 illustrates an example 1300 of a user equipment (UE) 1015-f in which the UE 1015-f includes transmit circuitry 1305 (including PA 1310), receive circuitry 1315, power controller 1320, decode processor 1325, a processing unit 1330 for use in processing signals, memory 1335, and one or more antennas. The UE 1015-f may be an example of the AT 115 described with reference to FIG. 1 or 2. The transmit circuitry 1305 and the receive circuitry 1315 may allow transmission and reception of data, such as audio communications, between the UE 1015-f and a remote location. The transmit circuitry 1305 and receive circuitry 1315 are coupled to an antenna(s) 1345.

The processing unit 1330 controls operation of the UE 1015. The processing unit 1330 may also be referred to as a CPU. The memory 1335, which may include both read-only memory (ROM) and random access memory (RAM), provides instructions and data to the processing unit 1330. A portion of the memory 1335 may also include non-volatile random access memory (NVRAM).

The various components of the UE 1015 are coupled together by a bus system 1350 which may include a power bus, a control signal bus, and a status signal bus in addition to a data bus. For the sake of clarity, the various busses are illustrated in FIG. 13 as the bus system 1350.

The steps of the methods discussed may also be stored as instructions in the form of software or firmware 1340 located in the memory 1335 in the Node B 105, as shown in FIG. 3. These instructions may be executed by the control unit 350 of Node B 105 in FIG. 3. Alternatively, or in conjunction, the steps of the methods discussed may be stored as instructions in the form of software or firmware 1340 located in the memory 1335 in the UE 1015. These instructions may be executed by the processing unit 1330 of the UE 1015 in FIG. 13.

Figure 14:
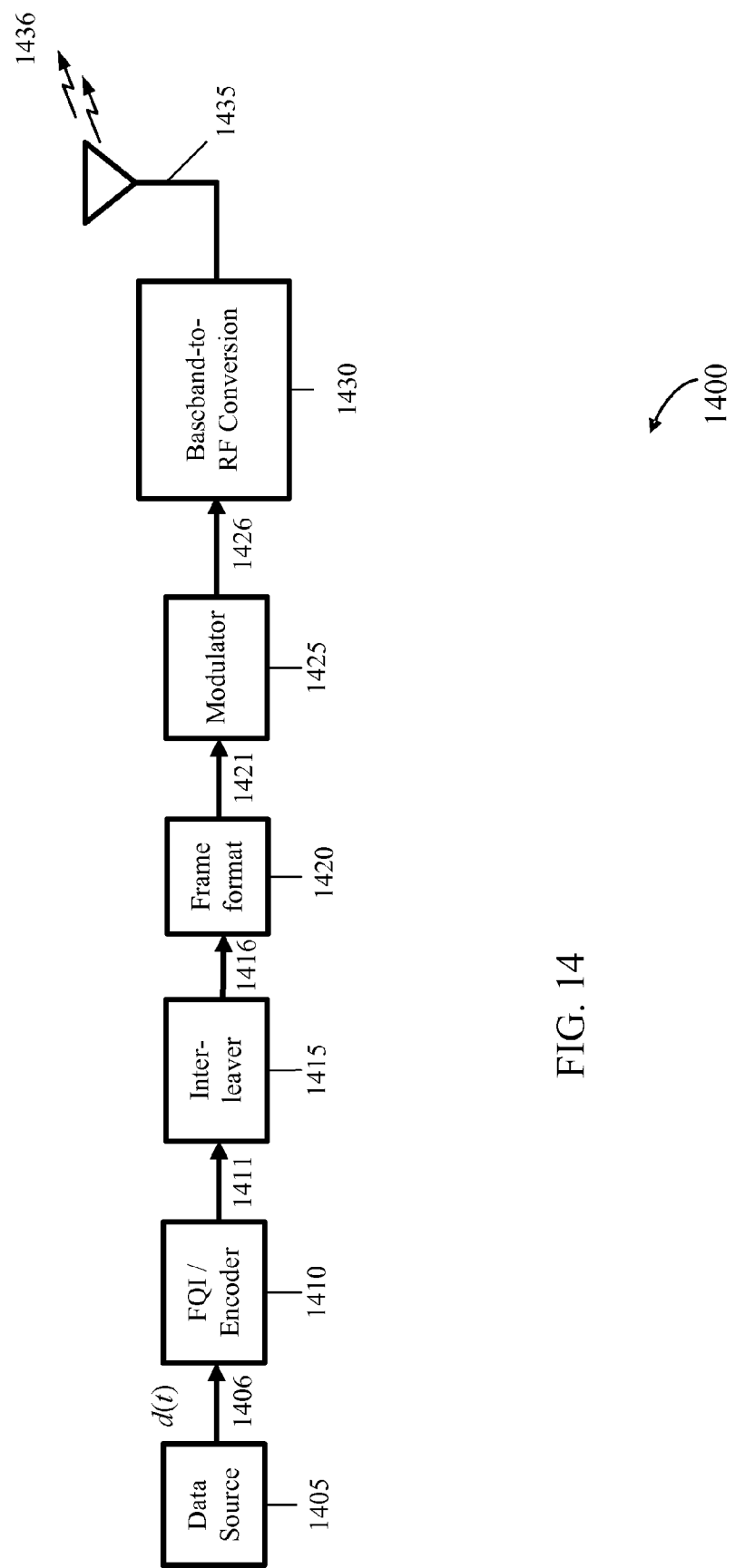
FIG. 14 is a functional block flow diagram of signals through structures of a transmitter.

FIG. 14 illustrates an example functional block flow diagram 1400 for a transmission from a UE 1015. A data source 1405 provides data d(t) 1406 to an FQI/encoder 1410. The FQI/encoder 1410 may append a frame quality indicator (FQI) such as a cyclic redundancy check (CRC) to the data d(t) 1406. The FQI/encoder 1410 may further encode the data and FQI using one or more coding schemes to provide encoded symbols 1411. Each coding scheme may include one or more types of coding, e.g., convolutional coding, Turbo coding, block coding, repetition coding, other types of coding, or no coding at all. Other coding schemes may include automatic repeat request (ARQ), hybrid ARQ (H-ARQ), and incremental redundancy repeat techniques. Different types of data may be encoded with different coding schemes.

An interleaver 1415 interleaves the encoded data symbols 1411 in time to combat fading, and generates symbols 1416. The interleaved symbols of signal 1416 may be mapped by a frame format block 1420 to a pre-defined frame format to produce a frame 1421. A frame format may specify the frame as being composed of a plurality of sub-segments. Sub-segments may be any successive portions of a frame along a given dimension, e.g., time, frequency, code, or any other dimension. A frame may be composed of a fixed plurality of such sub-segments, each sub-segment containing a portion of the total number of symbols allocated to the frame. For example, according to the W-CDMA standard, a sub-segment may be defined as a slot. According to the cdma2000 standard, a sub-segment may be defined as a power control group (PCG). In one example, the interleaved symbols 1416 are segmented into a plurality S of sub-segments making up a frame 1421.

A frame format may further specify the inclusion of, e.g., control symbols (not shown) along with the interleaved symbols 1416. Such control symbols may include, e.g., power control symbols, frame format information symbols, etc.

A modulator 1425 modulates the frame 1421 to generate modulated data 1426. Examples of modulation techniques include binary phase shift keying (BPSK) and quadrature phase shift keying (QPSK). The modulator 1425 may also repeat a sequence of modulated data.

A baseband-to-radio-frequency (RF) conversion block 1430 may convert the modulated signal 1426 to RF signals for transmission via one or more antenna(s) 1435 as signal 1436 over a wireless communication link to one or more Node Bs 1005.

Considerations Regarding the Description

The detailed description set forth above in connection with the appended drawings describes exemplary examples and does not represent the only examples that may be implemented or that are within the scope of the claims. The term "exemplary" used throughout this description means "serving as an example, instance, or illustration," and not "preferred" or "advantageous over other examples." The detailed description includes specific details for the purpose of providing a thorough understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks, servers, and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates a example or instance and does not imply or require any preference for the noted example. Thus, the disclosure is not to be limited to the examples and designs described herein but is to be accorded the widest scope consistent with the principles and novel features disclosed herein.

What is claimed is:

1. An access terminal of a wireless communication system, the access terminal comprising:
one or more antennas configured to transmit and receive wireless communications;
a transceiver coupled with the antenna;
a memory storing data identifying common timing parameters for discontinuous uplink transmissions on each of a plurality of wireless carriers usable for concurrent transmissions from the access terminal; and
a processor coupled with the transceiver and the memory, the processor comprising a plurality of state control hardware modules within the access terminal, wherein each of the plurality of state control hardware modules within the access terminal is operable to run concurrently on a corresponding one of the plurality of wireless carriers, and the processor being configured to:
identify by a first of the plurality of state control hardware modules within the access terminal, a first operational state to be associated with a first carrier of the plurality of wireless carriers;
identify by a second of the plurality of state control hardware modules within the access terminal, a second operational state, different from the first operational state, to be associated with a second carrier of the plurality of wireless carriers;
cause the transceiver, in accordance with the common timing parameters, to operate concurrently on the first carrier by the first of the plurality of state control hardware modules within the access terminal in the first operational state, in accordance with the common timing parameters utilized by the first carrier, and on the second carrier by the second of the plurality of state control hardware modules within the access terminal in the second operational state different from the first operational state, in accordance with the common timing parameters utilized by the second carrier;
receive schedule information for the first operational state on the first carrier at the access terminal; and
receive schedule information for the second operational state on the second carrier at the access terminal.

2. The access terminal of claim 1 wherein,
the first operational state comprises a data transmitting state; and
the second operational state comprises a periodic burst state during an inactive data transmission period.

3. The access terminal of claim 1 wherein,
the first operational state comprises a first periodic burst state during an inactive data transmission period; and
the second operational state comprises a second periodic burst state during an inactive data transmission period, wherein there is a longer duration between bursts in the second periodic burst state than the first periodic burst state.

4. The access terminal of claim 1 wherein the common timing parameters comprise a same burst length for burst transmission during an inactive data transmission period.

5. The access terminal of claim 1 wherein the common timing parameters comprise a same time between bursts during an inactive data transmission period.

6. The access terminal of claim 1 wherein the common timing parameters comprise:
a same first time between bursts during a first inactive data transmission period; and
a same second time, longer than the first time, between bursts during a second inactive data transmission period, the second inactive period occurring for a respective carrier when an inactivity timer exceeds a threshold.

7. The access terminal of claim 6 wherein the common timing parameters comprise the threshold, the threshold comprising a same inactivity threshold.

8. The access terminal of claim 1 wherein the first operational state and the second operational state have a common and synchronized transmit timing interval.

9. The access terminal of claim 1 wherein the first carrier and the second carrier comprise adjacent carriers.

10. The access terminal of claim 1 wherein the processor is further configured to:
identify the second operational state to be associated with a third carrier of the plurality of wireless carriers; and
cause the transceiver to operate on the third carrier in the second operational state in accordance with the common timing parameters.

11. The access terminal of claim 10 wherein the processor is configured to cause the transceiver to operate concurrently on the second carrier in the second operational state and the third carrier in the second operational state, wherein the second carrier and the third carrier have a common and synchronized transmit timing interval.

12. An access terminal for discontinuous uplink transmissions on a plurality of wireless carriers, the access terminal comprising:
first means within the access terminal for identifying common timing parameters to be used for discontinuous uplink transmissions on each of a plurality of wireless carriers usable for concurrent transmissions from the access terminal;
second means within the access terminal for identifying a first operational state to be associated with a first carrier of the plurality of wireless carriers; and
third means within the access terminal different from said second means within the access terminal for identifying a second operational state, different from the first operational state, to be associated with a second carrier of the plurality of wireless carriers, wherein the second means and the third means within the access terminal are operable to run concurrently on a corresponding one of the plurality of wireless carriers,
wherein the second means within the access terminal is for causing the first carrier to be operated in the first operational state in accordance with the common timing parameters,
wherein the third means within the access terminal is for causing the second carrier to be operated in the second operational state in accordance with the common timing parameters,
wherein the second carrier is operated by the third means within the access terminal in the second operational state different from the first operational state, in accordance with the common timing parameters utilized by the second carrier, concurrently with the first carrier being operated by the second means within the access terminal in the first operational state, in accordance with the common timing parameters utilized by the first carrier,
wherein the third means receives by the access terminal, schedule information for the first operational state on the first carrier at the access terminal; and
wherein the third means receives by the access terminal schedule information for the second operational state on the second carrier at the access terminal.

13. The access terminal of claim 12 wherein,
the first operational state comprises a data transmitting state; and
the second operational state comprises a periodic burst state during an inactive data transmission period on the second carrier.

14. The access terminal of claim 12 wherein the first operational state and the second operational state have a common transmit timing interval.

15. A non-transitory computer-readable medium comprising code configured to cause a processor in an access terminal to:
identify common timing parameters to be used for discontinuous uplink transmissions on each of a plurality of wireless carriers usable for concurrent transmissions from the access terminal;
identify by a first state control module within the access terminal, a first operational state to be associated with a first carrier of the plurality of wireless carriers;
identify by a second state control module within the access terminal different from said first state control module within the access terminal, a second operational state, different from the first operational state, to be associated with a second carrier of the plurality of wireless carriers, wherein the first state control hardware module and the second state control hardware module within the access terminal are operable to run concurrently on a corresponding one of the plurality of wireless carriers;
cause the first carrier to be operated by the first state control module within the access terminal, in the first operational state in accordance with the common timing parameters; and
cause the second carrier to be operated by the second state control module within the access terminal, in the second operational state in accordance with the common timing parameters,
wherein the second carrier is operated by the second state control module within the access terminal, in the second operational state different from the first operational state, in accordance with the common timing parameters utilized by the second carrier, concurrently with the first carrier being operated by the first state control module within the access terminal, in the first operational state, in accordance with the common timing parameters utilized by the first carrier;
receive schedule information for the first operational state on the first carrier at the access terminal; and
receive schedule information for the second operational state on the second carrier at the access terminal.

16. The non-transitory computer-readable medium of claim 15 wherein the code configured to cause the processor in an access terminal to:
cause the first carrier to be operated in the first operational state comprise code to cause the processor to transmit the first operational state schedule information; and
cause the second carrier to be operated in the second operational state comprise code to cause the processor to transmit the second operational state schedule information.

17. A processor in an access terminal to establish discontinuous uplink transmissions on a plurality of wireless carriers, the processor comprising:
a parameter controller configured to identify common timing parameters to be used for discontinuous uplink transmissions on each of a plurality of wireless carriers usable for concurrent transmissions from the access terminal;
a first carrier state controller within the access terminal, coupled with the parameter controller, and configured to:
identify a first operational state to be associated with a first carrier of the plurality of wireless carriers; and cause the first carrier to be operated in the first operational state in accordance with the common timing parameters; and a second carrier state controller within the access terminal, coupled with the parameter controller, and configured to:

identify a second operational state, different from the first operational state, to be associated with a second carrier of the plurality of wireless carriers; and cause the second carrier to be operated in the second operational state in accordance with the common timing parameters; and wherein:

the first carrier state controller and the second carrier state controller within the access terminal are operable to run concurrently on a corresponding one of the plurality of wireless carriers;

the second carrier is operated by the second carrier state controller within the access terminal in the second operational state different from the first operational state, in accordance with the common timing parameters utilized by the second carrier, concurrently with the first carrier being operated by the first carrier state controller within the access terminal in the first operational state, in accordance with the common timing parameters utilized by the first carrier;

the processor receives schedule information for the first operational state on the first carrier at the access terminal; and the processor receives schedule information for the second operational state on the second carrier at the access terminal.

18. The processor of claim 17, wherein the processor is communicatively coupled with a memory configured to:

store common timing parameters to be used for discontinuous uplink transmissions on each of the plurality of wireless carriers usable for concurrent transmissions from the access terminal; and store schedule information for the first operational state on the first carrier at the access terminal and store schedule information for the second operational state on the second carrier at the access terminal.

19. A method for wireless communication, the method comprising:

storing by an access terminal, data identifying common timing parameters for discontinuous uplink transmissions on each of a plurality of wireless carriers usable for concurrent transmissions from the access terminal;

identifying by a first of a plurality of state control hardware modules within the access terminal, a first operational state to be associated with a first carrier of the plurality of wireless carriers;

identifying by a second of the plurality of state control hardware modules within the access terminal, a second operational state, different from the first operational state, to be associated with a second carrier of the plurality of wireless carriers, wherein:

each of the plurality of state control hardware modules within the access terminal is operable to run concurrently on a corresponding one of the plurality of wireless carriers; and in accordance with the common timing parameters, the access terminal operate concurrently on the first carrier by the first of the plurality of state control hardware modules within the access terminal in the first operational state, in accordance with the common timing parameters utilized by the first carrier, and on the second carrier by the second of the plurality of state control hardware modules within the access terminal in the second operational state different from the first operational state, in accordance with the common timing parameters utilized by the second carrier;

receiving by the access terminal, schedule information for the first operational state on the first carrier at the access terminal; and receiving by the access terminal schedule information for the second operational state on the second carrier at the access terminal.

20. The method of claim 19, wherein, the first operational state comprises a data transmitting state; and the second operational state comprises a periodic burst state during an inactive data transmission period.

21. The method of claim 19, wherein, the first operational state comprises a first periodic burst state during an inactive data transmission period; and the second operational state comprises a second periodic burst state during an inactive data transmission period, wherein there is a longer duration between bursts in the second periodic burst state than the first periodic burst state.

22. The method of claim 19, wherein the common timing parameters comprise a same burst length for burst transmission during an inactive data transmission period.

23. The method of claim 19, wherein the common timing parameters comprise a same time between bursts during an inactive data transmission period.

24. The method of claim 19, wherein the common timing parameters comprise:

a same first time between bursts during a first inactive data transmission period; and a same second time, longer than the first time, between bursts during a second inactive data transmission period, the second inactive period occurring for a respective carrier when an inactivity timer exceeds a threshold.

25. The method of claim 24, wherein the common timing parameters comprise the threshold, the threshold comprising a same inactivity threshold.

26. The method of claim 19, wherein the first operational state and the second operational state have a common and synchronized transmit timing interval.

27. The method of claim 19, wherein the first carrier and the second carrier comprise adjacent carriers.

28. The method of claim 19, wherein the access terminal is further configured to:

identify the second operational state to be associated with a third carrier of the plurality of wireless carriers; and cause a transceiver in the access terminal to operate on the third carrier in the second operational state in accordance with the common timing parameters.

29. The method of claim 28, wherein the access terminal is configured to cause the transceiver to operate concurrently on the second carrier in the second operational state and the third carrier in the second operational state, wherein the second carrier and the third carrier have a common and synchronized transmit timing interval.

* * * * *